US009372592B1

(12) United States Patent
Goodspeed et al.

(10) Patent No.: US 9,372,592 B1
(45) Date of Patent: Jun. 21, 2016

(54) PRESENTING INFORMATION RELATED TO CONTENT ITEMS

(71) Applicants: Joshua M. Goodspeed, London (GB); Peter Thomas Killalea, Seattle, WA (US); Donald E. Schneider, Kirkland, WA (US)

(72) Inventors: Joshua M. Goodspeed, London (GB); Peter Thomas Killalea, Seattle, WA (US); Donald E. Schneider, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 68 days.

(21) Appl. No.: 13/625,488

(22) Filed: Sep. 24, 2012

(51) Int. Cl.
*G06F 3/0481* (2013.01)

(52) U.S. Cl.
CPC .................................. *G06F 3/0481* (2013.01)

(58) Field of Classification Search
CPC ..................... G06F 3/0485; G06F 2203/04806; G06F 3/04845; G06F 3/048
USPC ........ 725/44, 46, 39; 707/705, 722, 723, 732, 707/736, 748; 345/168, 169
See application file for complete search history.

(56) References Cited

U.S. PATENT DOCUMENTS

| 8,151,194 | B1* | 4/2012 | Chan et al. ..................... 715/716 |
| 8,364,724 | B2* | 1/2013 | Stolte et al. ..................... 707/805 |
| 8,654,942 | B1* | 2/2014 | Garrett et al. .............. 379/93.21 |
| 8,689,103 | B2* | 4/2014 | Lindley et al. ................. 715/726 |
| 8,910,084 | B2* | 12/2014 | Helfman et al. .............. 715/854 |
| 2002/0103920 | A1* | 8/2002 | Berkun et al. ................. 709/231 |
| 2004/0169654 | A1* | 9/2004 | Walker et al. ................. 345/440 |
| 2007/0074252 | A1* | 3/2007 | Nazarian et al. ................. 725/46 |
| 2007/0233726 | A1* | 10/2007 | Torrens et al. ................ 707/102 |
| 2008/0172629 | A1* | 7/2008 | Tien et al. ..................... 715/771 |
| 2008/0189274 | A1* | 8/2008 | Mann ................................. 707/5 |
| 2009/0019034 | A1* | 1/2009 | Franks et al. ...................... 707/5 |
| 2009/0048959 | A1* | 2/2009 | Omura et al. ................... 705/35 |
| 2009/0204580 | A1* | 8/2009 | Seamon et al. ................... 707/3 |
| 2009/0271283 | A1* | 10/2009 | Fosnacht et al. ............... 705/26 |
| 2010/0071000 | A1* | 3/2010 | Amento et al. ................. 725/39 |
| 2011/0258569 | A1* | 10/2011 | Weir et al. ..................... 715/771 |
| 2012/0154403 | A1* | 6/2012 | Mital et al. .................... 345/440 |
| 2012/0159543 | A1* | 6/2012 | Jin ................... H04N 21/25841 725/39 |
| 2013/0061267 | A1* | 3/2013 | Cansino et al. ................. 725/43 |

* cited by examiner

*Primary Examiner* — Jeffrey A Gaffin
*Assistant Examiner* — Mandrita Brahmachari
(74) *Attorney, Agent, or Firm* — Lee & Hayes, PLLC

(57) ABSTRACT

An electronic device may present an interface providing information related to one or more content items. For example, the interface may present representations related to a plurality of content items to indicate relative values among the content items of at least one metric. Additionally, each representation may further indicate at least one of a quality of the value of the metric or a different metric value. A user may navigate the interface to more specific or more general views for a particular metric, characteristic and/or category, and may use the interface to view more information about a selected content item. Alternatively, the representations may represent, or may be arranged according to, authors, publishers, genres, etc. In some examples, the representations may represent terms obtained from content items that satisfy one or more metrics, such as terms that occur in content items sold within a specified period of time.

36 Claims, 16 Drawing Sheets

PRESENTING INFORMATION RELATED TO CONTENT ITEMS

BACKGROUND

The continued proliferation of digital content items has led to an increase in the availability of such content items, as well as an increase in the availability of electronic devices and applications used for consuming these content items. For instance, users may consume textual content items, such as electronic books (eBooks) and other types of content items on an assortment of electronic devices. As the number of content items and devices for consuming content items continues to increase, users are ever more interested in enhancing their experiences while acquiring and consuming these content items. Further, content providers continue to seek ways to provide information about content items to those interested.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
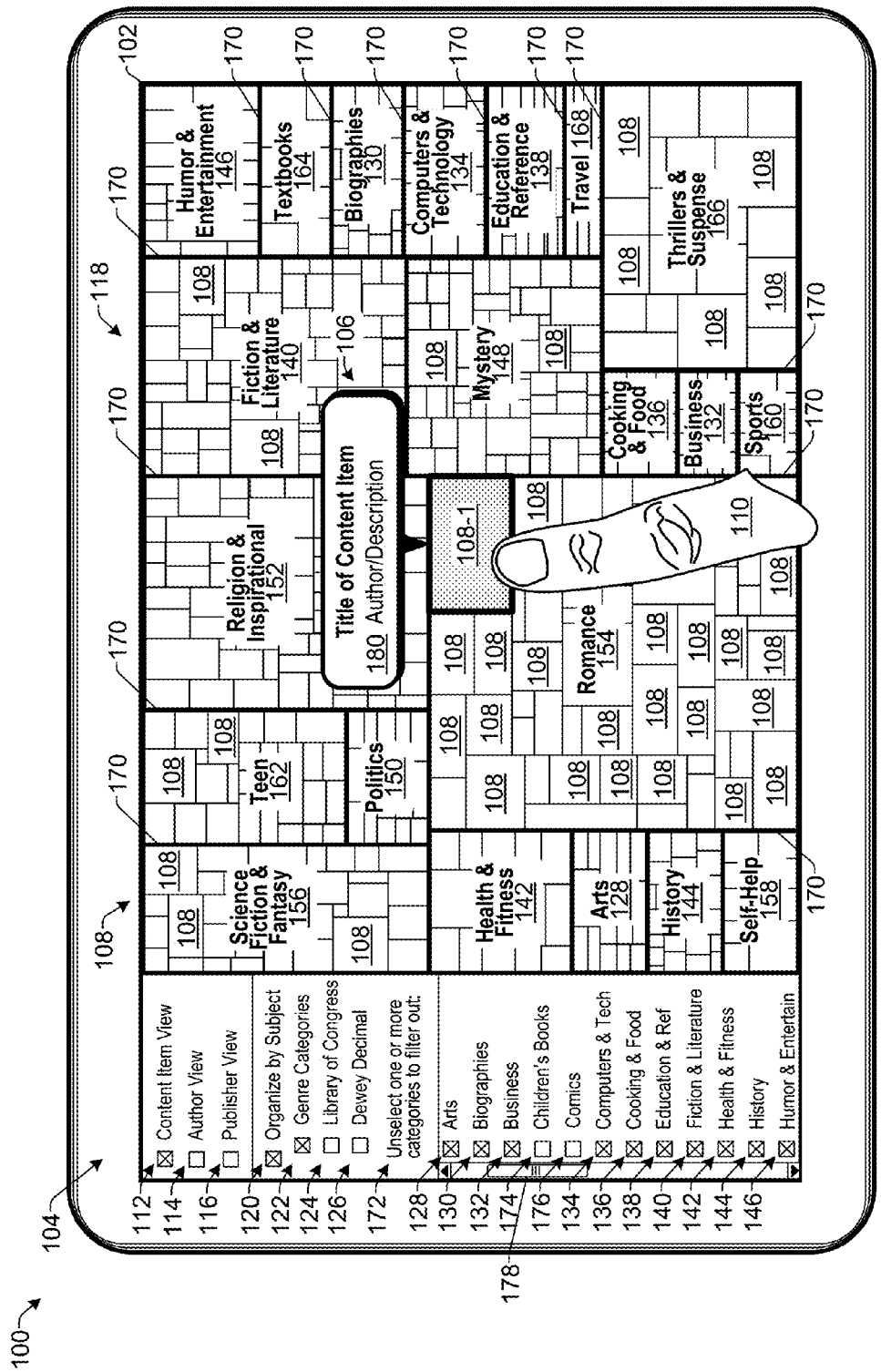
FIG. 1 illustrates an example interface for presenting information related to content items in category groupings according to some implementations.

This disclosure includes techniques and arrangements for presenting information related to content items. For instance, an electronic device may present an interface on a display. In some examples, the interface may provide information related to a plurality of content items, such as sales information, recent use information, annotation information, user review rating information, author information, publisher information, trending information, and so forth. For example, the interface may present information showing how a plurality of content items compare to one another according to one or more metrics. The interface may further provide information as to a rate of change of the one or more metrics over time for each of the content items, or other quality of each metric.

As one example, suppose that a user of an electronic device is shopping for a content item and would like to determine which content items rank high in sales; which content items have been recently open on devices of other users; which content items are currently trending on at least one online location, such as on social networks or microblogs; which content items have been browsed or purchased recently by other users having similar interests or reading habits; or any of numerous other possible metrics. The user may access an interface that provides visualization of a plurality of content items relative to one another based on one or more selected metrics, characteristics, categories, genres, and the like. For instance, if the user is only interested in romance and science fiction content items, the user may filter out or remove from the interface information related to other content items that are not categorized in those two categories. In some examples, the interface may include a plurality of representations of content items, and each representation may provide an indication of a value of at least one metric with respect to the represented content item. For instance, an area or size of a representation relative to the area or size of the other representations may indicate relative values of the at least one metric for the corresponding content items. Additionally, in some examples, the representations may further provide an indication of a quality of the value of the particular metric, such as a recent rate of change of the value of the particular metric for each content item. In addition, the user may be able to navigate within the interface to a personalized or customized view, such as a view that exclusively shows representations of content items in the romance category and/or the science fiction category.

In some examples, the representations may be grouped in the interface according to categories, such as genre categories, Dewey decimal categories, Library of Congress classification categories, or other categorization schemes, taxonomies, and the like. Further, the user may have the option to select among a number of different categorization techniques in the interface. In addition, in some examples, the interface may enable the user to select among individual categories to be displayed in the interface or filtered out from the interface. For instance, following selection of one or more categories to be excluded, the interface may rearrange and/or resize the representations for the remaining categories to fill a representation area of the interface. Thus, the size of each category or subcategory presented in the interface may be related to the values of the selected metric as well. For example, the size of a block or boarder around each category may be relative to the sizes of the other categories based on the selected metric. Furthermore, the interface may enable a user to advance or navigate among various categories, subcategories, and representations of content items. For example, a user may select a representation of a particular content item to view more information about the content item and/or to make a purchase of the content item.

Additionally, in some examples, the interface may provide representations that correspond to authors or publishers of content items, rather than the content items themselves. For example, the user may select an author view in which each representation in the interface represents one or more metrics for an author relative to other authors represented by other representations displayed in the interface. Accordingly, the user may be able to determine visually which authors have had the largest number of sales of all their works over a certain period of time, which authors are currently being read on other user devices, which authors have the highest user review ratings, and so forth. Representations for publishers may be similarly represented in the interface by selection of a publisher view.

Furthermore, in some examples, a content provider may determine a plurality of terms that are significant in a particular content item, such as significant character names, topics, organizations, places, things and the like. The content provider may aggregate the terms identified across a plurality of content items for determining a frequency of each term in the plurality of the content items. In some examples, the identified terms may be weighted according to other metrics, such as total sales for each content item over a period of time, for determining a significance of each term relative to the other terms. The relative significance of the terms for a particular metric may be presented in an interface by a plurality of representations. For example, a size of a representation for each term may indicate a relative value of a metric for the term compared to the value for the metric for the other terms. The representations may further indicate a metric quality, such as a rate of change of the metric over a period of time, e.g., whether the significance of the term is increasing, decreasing, or has remained about the same.

For discussion purposes, some example implementations are described in the environment of presenting an interface for visualizing information related to content items. However, the implementations herein are not limited to the particular examples provided, and may be extended to other types of interface configurations, other types of representations, and other types of content items, as will be apparent to those of skill in the art in light of the disclosure herein.

Example Interfaces

FIG. 1 illustrates an example electronic device 100 able to present information related to content items according to some implementations. The electronic device 100 may be implemented as any of a number of different types of electronic devices, as discussed further below. The electronic device 100 may include, or may have associated therewith, a display 102 to present an interface 104 for providing information related to one or more content items 106. In some examples, the interface 104 may present representations 108 that provide information about corresponding respective content items 106. For example, the representations 108 may be arranged according to various taxonomies, characteristics, subjects, categories, or the like. In other examples, however, the representations 108 may be arranged in other manners, such as from largest to smallest, according to fastest-growing to fastest-shrinking, alphabetically, accordingly publisher, or by any of numerous other categorization or ordering techniques, as will be apparent to those of skill in the art having the benefit of the disclosure herein.

In some types of electronic devices 100, the display 102 may be a touch-sensitive display configured with a sensor to sense a touch input received from an input effecter 110, such as a finger of a user, a stylus, or the like. Thus, the touch-sensitive display may receive one or more touch inputs, stylus inputs, selections of text, selections of interface components, and so forth. In other implementations, the display 102 may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and the interface 104 presented on the display 102. Additionally, in some implementations, one or more voice commands may be used to control or interact with the interfaces or content items herein. Further, in some examples, a user's eye position or point of focus may be detected to serve as inputs or commands. Thus, implementations herein are not limited to any type of input devices, techniques, or controls.

In some cases, the one or more content items 106 may be physical books or electronic books (eBooks) including one or more pages of text and possibly also including images, illustrations, tables, maps, graphic elements, embedded multimedia content, and so forth. Thus, the terms "book" and/or "eBook," as used herein, may broadly include printed works, as well as electronic or digital representations of printed works that may include text, images, multimedia, hypertext and/or hypermedia. Examples of content items 106 may include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. The content items 106 herein may additionally, or alternatively, be other types of content items including music, songs, audio books, videos, movies, television shows, games, and the like.

In the illustrated example of FIG. 1, suppose that a user has accessed the interface 104 and is presented with a content item view 112 of the interface 104. Other possible view selections in this example may include an author view 114 and a publisher view 116. The content item view 112 may present a plurality of the representations 108 corresponding to a plurality of content items 106 in a representation area 118. In this example, each representation 108 is in the form of a rectangle (which may include squares), the size of which may be relative to others of the representations 108 based on one or more characteristics or metrics of the content item 106 that the representation represents. For example, a larger sized rectangle may indicate a larger value for a particular metric such as total sales, highest ranked reviews, number of the content items recently open on user devices and so forth. Accordingly, in the content item view 112, each of the representations 108 in the representation area 118 may represent a different content item 106, and the relative size of the representation 108 may convey information as to a value of a particular metric with respect to the corresponding content item 106. Similarly, as discussed below, if the author view 114 is selected, the representations 108 may each correspond to a different author, and a size of the each representation may indicate a value of a particular metric for the particular author relative to other authors represented by the other representations 108. Likewise, if the publisher view 116 is selected, each representation 108 may represent a particular publisher, and the size of the representation relative to other representations may represent a value of a particular metric for the publisher in comparison with a value of that metric for other publishers.

The representations 108 may be further grouped or organized according to one or more characteristics, taxonomies, classifications, or other categories, as indicated at 120. In the illustrated example, the representations are grouped according to a genre classification or genre category 122. Other example groupings in this example include a grouping according to Library of Congress classification system 124 or a grouping according to the Dewey decimal classification system 126. Additional examples not show in FIG. 1 may include BISAC (Book Industry Standards and Communication) subject codes, Colon classification categories, OCLC (Online Computer Library Center) category codes, and the like. Various other types of categories, taxonomies or groupings may also be displayed in the interface 104, as discussed herein, or as will be apparent to those of skill in the art having the benefit of the disclosure herein, with the foregoing being just several examples.

In this example, a plurality of genre categories or groupings of the representations 108 are displayed in the interface 104, including arts 128, biographies 130, business 132, computers & technology 134, cooking & food 136, education & reference 138, fiction & literature 140, health & fitness 142, history 144, humor & entertainment 146, mystery 148, politics 150, religion & inspirational 152, romance 154, science fiction & fantasy 156, self-help 158, sports 160, teen 162, textbooks 164, thriller & suspense 166 and travel 168. The boundary between each category may be clearly delineated in the representation area 118 by boundary lines 170, and thus, a user may easily determine visually which representations correspond to which genre category.

Furthermore, as indicated at 172, the user may unselect one or more categories to personalize or customize the view presented by the interface 104. For example, the categories also may be listed to one side of the representation area 118, along with a selection box adjacent to each category name. Thus, when the adjacent selection box is selected, the corresponding category and associated representations 108 may be displayed in the representation area 118. On the other hand, if user unselects a selection box adjacent to one or more category names, those categories and associated representations 108 are not displayed in the representation area 118.

In the illustrated example, suppose that the user has unselected a children's books category 174 and a comics category 176. Accordingly, these categories 174, 176 and associated representations are not displayed in the representations area 118 in the example of FIG. 1. A scroll bar 178 may be included in the interface 104 to enable a user to scroll down to select or unselect various other categories discussed above and/or other categories. Furthermore, when a particular category is not presented in the interface, the remaining categories may be resized relative to one another to fill the presentation area 118. Additionally, as mentioned above, the relative sizes of each category in the interface 104 may be in proportion or based at least in part on the value of a selected metric with respect to each category. As one example, in the case that the metric is total sales, the category romance 154 is proportionally larger than the other categories, which represents that more content items were sold in this category over a particular period of time than in the other categories currently presented in the representation area 118.

In other examples, the representations 108 may not be grouped according to categories. For example, the user may deselect the "organize by subject" option at 120. In this case, the representations 108 may be presented based on relative size, such as for a selected number of representations, as discussed below. For instance, the user may wish to view the top 25 best selling content items over the past week, regardless of category or genre. Further, the user may still filter out content items in certain categories, such as by selecting or deselecting from the list of categories 128-168. Numerous other selection options are discussed below.

In addition, a user may select a particular representation 108 to obtain additional information. For example, suppose that the user selects the representation 108-1, such as by tapping-on, clicking-on, or otherwise performing a user input to select the representation 108-1. The selected representation 108-1 may be highlighted or otherwise visually distinguished from the other representations 108 in the representation area 118. Furthermore, a pop-up window, interface or label 180 may also be displayed in association with the selected representation 108-1. For instance, the popup window or label 180 may identify a title of the content item 106 and/or an author of the content item 106. Additionally, in some examples, the label 180 may include additional information about the content item 106, such as a description, a synopsis, user review rating, purchase price, a link to purchase the content item, or the like. Alternatively, in some examples, the user may double tap, double-click or otherwise perform further input with respect to at least one of the representation 108-1 or the label 180 to access the additional information about the content item 106, such as to access a webpage, webview or pop up interface to view the additional information about the content item. In either case, the user may then choose to purchase the content item or may close the pop up interface to return to the interface 104 to view information related to other content items 106.

Figure 2A:
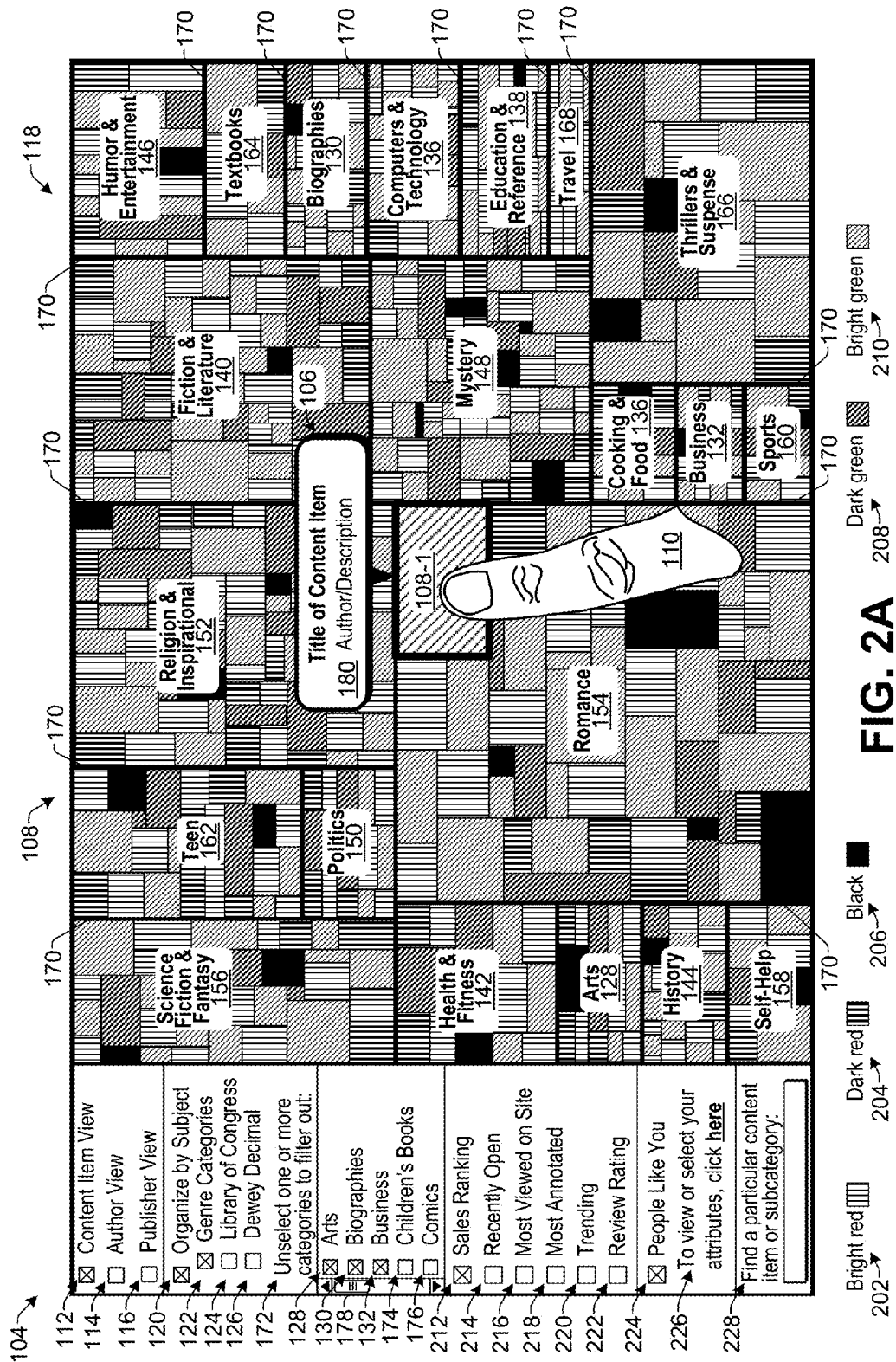
FIG. 2A illustrates an example interface for presenting information related to content items in category groupings according to some implementations.

FIG. 2A illustrates an example of the interface 104 for presenting information related to content items according to some implementations. In this example, each representation 108 in the interface 104 may convey additional information based on an appearance of the representation 108. For example, each representation may include a graphic effect, such as being filled with a pattern or color, or by including a graphic element, that indicates the additional information. As one example, the pattern, color or other graphic effect may indicate a quality of the value of the metric, such as a rate of change over time of a metric value represented by the size of the representation. As another example, the pattern, color or other graphic effect may represent a different metric value from a metric value represented by the size of the representation. As one example, when a selected metric is total sales over a period of time, as discussed above, the area or size of the representation 108 may indicate a number of sales of a particular content item 106 relative to the other content items 106 represented by the other representations 108 in the representation area 118. Accordingly, a larger rectangle may indicate that the corresponding content item 106 has had a larger number of sales over a particular period of time than content items corresponding to representations 108 that are smaller rectangles.

Additionally, in the example of FIG. 2A, a pattern or color of the representation 108 may indicate a rate of change in the selected metric. For example, the pattern or color may indicate whether the number of sales has increased over the period of time, decreased over the period of time, or remained relatively stagnant during the period of time. As one nonlimiting example, as indicated at 202, a first pattern, such as vertical hatch lines, or a first color, such as light red or bright red, may indicate a large decrease in the metric; as indicated at 204; a second pattern, such as darker vertical hatch lines, or a second color, such as dark red, may indicate a smaller decrease in the metric than 202; as indicated at 206, a third pattern, such as solid shading, or a third color, such as black, may indicate there was little change in the value of the metric over the period of time; as indicated at 208, a fourth pattern, such as diagonal crosshatching with a dark lines or a fourth color, such as dark green, may indicate an increase in the metric over the period of time; and, as indicated at 210, a fifth pattern, such as diagonal crosshatching with lighter lines, or a fifth color, such as light or bright green, may indicate a larger change in the metric than 208. Further, while five gradations are described for the graphic effect in this example, in other examples, there may be a larger or smaller number of gradations, or there may be smooth transitions between the colors, patterns, and the like. For example, any of a brightness, lightness or intensity of the color may distinguish a greater rate of change from a lesser rate of change, or any other suitable graphic effects may be employed.

Accordingly, a user may select a very bright green representation to view information about a content item whose metric has increased substantially over a period of time. For example, if the metric is total sales, this content item may be a content item whose sales popularity is rapidly increasing. On the other hand, a content item that is bright red may be a content item whose sales popularity is rapidly decreasing, even though the size of the representation may be substantially larger than many other representations displayed in the representation area 118. Furthermore, the example patterns and/or colors 202-210 are mere examples for discussion purposes and numerous other patterns, colors, graphic schemes, color schemes, graphic elements, or other graphic effects will be apparent to those of skill in the art in light of the disclosure herein. Thus, the examples herein are not limited to any particular graphic effect, such as a graphic scheme, color scheme, or graphic element, and, indeed, some implementations may enable the user to select various different graphic effects to be applied to the representations 108. For example, the user may access an interface or menu to select various colors, patterns, graphic elements, or the like, to be applied to the representations 108.

FIG. 2A further illustrates that the user may select various different metrics to be displayed by the representations 108 in the interface 104. Several examples of metrics may include sales ranking 212, items recently open 214, items most viewed on a site 216, items most annotated 218, items currently trending 220, and user review rating 222, to name a few. For instance, sales ranking 212 may indicate a total number of sales of the content item over a period of time. In some examples, as discussed additionally below, the user may specify the period of time to be applied to the representations 108, such as over the past day, the past week, the past month, the past year, and so forth. Additionally, in some cases, the user may configure the interface 104 to distinguish between sales of physical or print content items, and sales of digital content items, such as eBooks.

The "recently open" metric 214 may indicate which content items 106 have been recently open on electronic devices 100 of other users according to the most recently gathered information. For example, a content provider may receive information from a plurality of user electronic devices 100 indicating which content items 106 have been open on the electronic devices 100. In some cases, the electronic devices 100 may periodically report synchronizing information back to the content provider indicating a current position of a user in a content item 106 open on the device 100. The content provider may aggregate this information received from multiple devices to determine which content items have been open recently on a plurality of devices 100, and thereby determine relative numbers of each different content item recently open on the user devices 100, such as by determining how many instances of each different content item have been recently open. In some examples, the determination of content items open on devices may be made in near real time, depending on how often user content item information is communicated from the devices 100, while in other examples, the "recently open" information may have some lag if the user content item information from the devices is communicated less frequently.

As another example, the content provider may maintain an online site or presence, such as a merchant website, to enable users to view information about content items 106, such as for deciding whether to purchase one or more of the content items 106. Accordingly, as indicated at 216, the content provider may keep track of which content items 106 offered by the content provider are browsed or viewed most often by users who access the content provider site. The content provider may provide in the interface 104 information regarding the relative number of content items 106 that are browsed or viewed on the site. Thus, a user may view this information in the interface 104 by selecting the metric for "most viewed on site" 216.

As still another example, when users make annotations to content items 106 on their electronic devices 100, the annotations may be conveyed back to the content provider to enable the content provider to synchronize the annotations to one or more other devices 100 of the user. For instance, annotations may include highlighting made to text of a content item, any notes or comments added to a content item by a user, bookmarks added to a content item by the user, or the like. The content provider may aggregate information about annotations made to various different content items by a plurality of users and may present this information in a visual representation such as in interface 104. Thus, a user may select the "most annotated" metric 218 to view in the interface 104 the relative proportions of annotations to the various content items. For example, the most annotated content items may be represented by larger rectangles than content items that have received fewer annotations.

In addition, the trending metric 220 may indicate which content items are trending on at least one online location, such a website or web feed, e.g., at least one of a social network (e.g., Facebook®), a microblog site (e.g., Twitter®), an RSS (really simple syndication) feed, a news feed, or the like. The content provider may monitor one or more sites, feeds, or the like to determine which content items are being discussed, or are otherwise trending, at the various online locations. The user may select the trending metric 220 to view the representations 108 configured according to the values of this metric 220.

Additionally, the user review rating metric 222 may indicate the relative rankings of content items based on user review ratings received by the content provider over a period of time. For example, a larger representation 108 may correspond to a content item that received higher review ratings from users over the period of time than a smaller representation 108, even though the smaller representation may correspond to a content item that has sold many more copies than the content item corresponding to the larger representation. In some examples, a threshold number of reviews may be required to avoid a situation in which a content item that has only received one or two reviews is inaccurately represented.

For any of the metrics 212-222, or for other metrics not included in this example, the size of a representation 108 may indicate a relative value of a selected metric, and the pattern or color of the representation 108 may indicate a rate of change in the metric over a period of time, e.g., that the value is increasing, decreasing, or has remained about the same, or other metric quality of the metric. Alternatively, as mentioned above, the pattern or color of a representation 108 may be used to convey information about a different metric than the metric represented by the size of the representation 108. In some examples, as discussed above, the size or area of the representation 108 may indicate a total number of sales of the content item over a period of time, while the pattern or color of the representation 108 may indicate any of recently open 214, most viewed 216, most annotated 218, trending 220, user review rating 222, or any of various other metrics. For instance, the representation 108-1 may be the largest representation in the representation area 118, indicating that the representation 108-1 corresponds to the content item that had the largest number of sales over a period of time, such as during the most recent week. Furthermore, when a second metric, such as user review rating 222 is selected, the representation 108-1 may be colored bright green 210, which may indicate that the corresponding content item had higher overall reviews than other content items corresponding to representations in the representation area 118 that are dark green 208, black 206, dark red 204 or bright red 202, which may represent an order of decreasing review rating. Additionally, while five gradations of patterns or colors are discussed in this example, any number of gradations may be applied, such as 2 gradations, 10 gradations, 15 gradations, or no gradations (i.e., smooth transitions from one gradation (e.g., color) to the next).

In some cases, a user may be able to customize or personalize the interface 104, or any of the other interfaces discussed herein, such as by skewing values applied to the displayed representations to be more representative of people that share one or more user characteristics or user attributes with the current user. For instance, suppose that the current user has certain reading habits such as preferring romance novels and arts books, and has not purchasing any biographies, science fiction, or mystery books. The interface 104 may be personalized to represent content item information gathered from other users that share at least one characteristic with the current user. In this case, the content provider may present information in the interface 104 collected from people with purchase histories similar to the current user, people who have provided reviews similar to the current user, etc. Thus, when the user selects a "people like you" option 224, the content provider may determine at least one attribute of the current user and may present the information based on the at least one user attribute. For example, when total sales ranking 212 is the metric for the representations 108, the interface 104 may only present sales information collected from users who share the at least one user attribute with the current user, such as preferring romance novels and arts books.

In some cases, the one or more user attributes for a user may be determined automatically by the content provider from user interaction with the content provider, such as purchases made, items viewed, demographic information, reviews of content items, and the like. Additionally, or alternatively, as indicated at 226, the user may manually provide attribute information to the content provider to enable a more accurate representation in the interface 104. For example, the user may select a link at 226 to access an interface to enter attribute information such as user preferences for types of content items, demographic information, and so forth.

Further, as indicated at 228, in some or all of the interfaces described herein, the user may manually search for a particular content item or a subcategory of content items. For instance, in some examples, if the display resolution permits, each representation 108 may include the title of the content item. However, in other examples on some or none of the representations 108 may include the title, such as in the case in which the display 102 has a small form factor or has a resolution that is too low to permit the display of the title in each representation 108. Thus, rather than having to tap on or click each representation in what may be hundreds of displayed representations in the interface 104, the user may enter some or all of the name of a content item or a subcategory in which the content item may be included to have the representation or subcategory highlighted. For instance, in response to the search at 228, one or more representations 108 may be highlighted in the representation area 118, one or more labels 180 may be displayed in the representation area, and so forth.

Furthermore, the user may navigate the view in the representation area 118 to a particular subcategory, to a sub-subcategory or the like. As one example, the user may select a category in the list of categories such as by tapping, double clicking, or the like, to have that category displayed in the representation area 118. As another example, the user may unselect all of the other categories using the selection boxes while leaving a desired category selected. As still another example, in the case of a touch sensitive display, the user may use a reverse pinch in the area of the particular category to zoom in on a desired category, or the user may tap on the title for the desired category, to select or maximize the particular category.

Figure 2B:
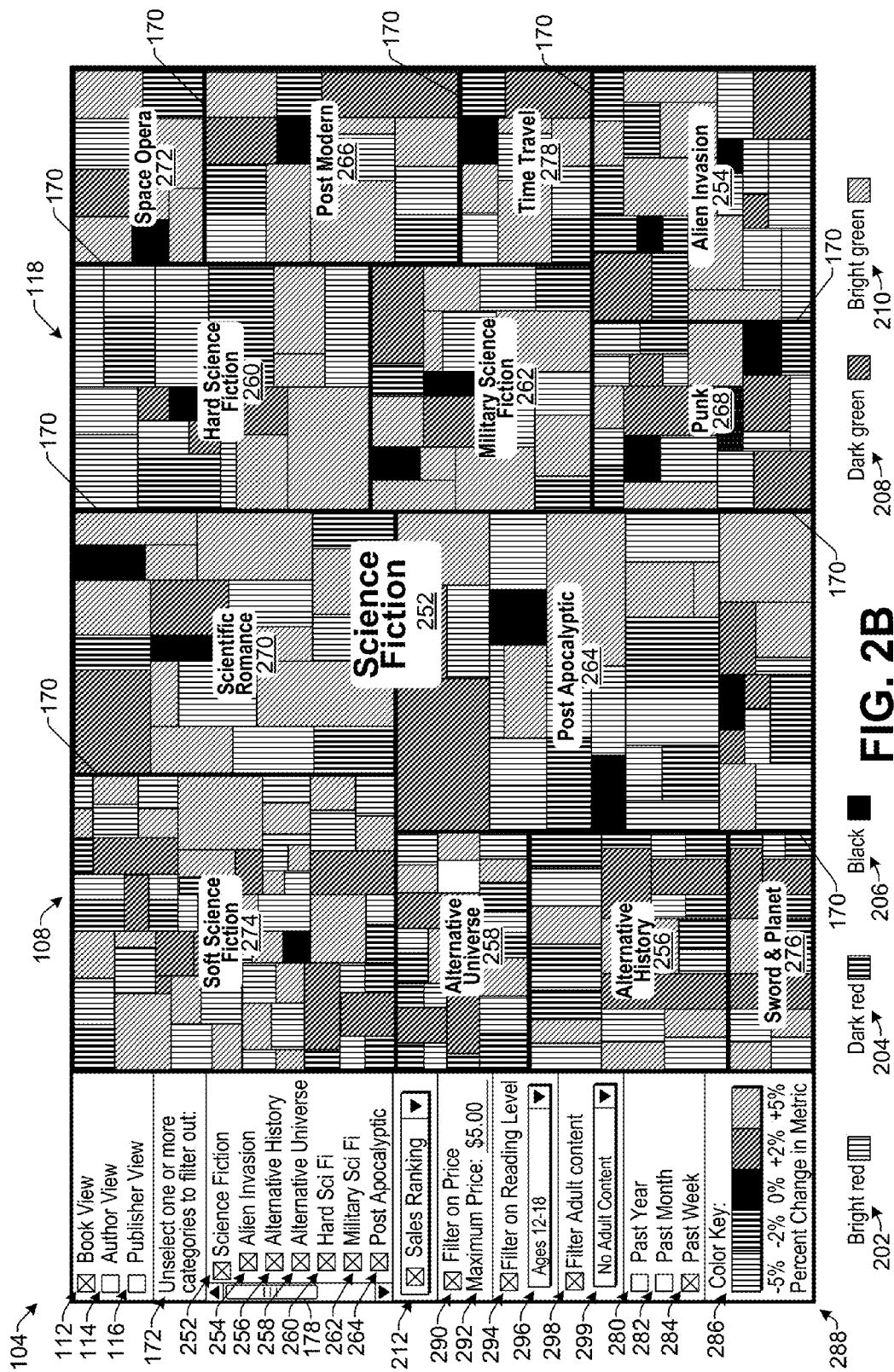
FIG. 2B illustrates an example interface for presenting information related to content items in a selected category according to some implementations.

FIG. 2B illustrates an example of the interface 104 for presenting information related to subcategories of content items according to some implementations. For example, suppose that the user has selected the science fiction & fantasy category 156 from FIG. 2A, and has further selected a science fiction subcategory 252 to be displayed in the representation area 118. In some examples, the user may unselect the other categories 130-168 from the interface to display a particular category. In other examples, the user may tap on or click on the Science Fiction & Fantasy label displayed in the interface 104 of FIG. 2A, which may result in the display of subcategories, such as Fantasy and Science Fiction. The user may then select the Science Fiction subcategory 252 to arrive at the interface configuration of FIG. 2B. As still another example, in the case of a touch screen, the user may use a reverse pinch touch input to zoom in on a selected category, subcategory, and so forth.

Upon selection of the science fiction subcategory 252, the interface 104 may further present additional subcategories of the selected subcategory 252. In this example, the additional subcategories may include alien invasion 254, alternative history 256, alternative universe 258, hard science fiction 260, military science fiction 262, post apocalyptic 264, post modern 266, punk 268, scientific romance 270, space opera 272, soft science fiction 274, sword & planet 276 and time travel 278. Accordingly, the representations 108 from the science fiction subcategory 252 may be automatically reorganized and relatively sized into the additional subcategories 254-278, which may be delineated by the borderlines 170. The subcategories 254-278 may also be represented in a navigation and preference menu 288 on the side of the interface 104. Thus, the interface 104 in this example now displays only a subset of the representations 108 that were previously displayed when additional categories were selected.

Furthermore, in some examples, additional representations 108 may be added to the representation area 118 for one or more of the additional subcategories 254-278. For example, due to space limitations, screen resolution limitations, or the like, of the display 102, when displaying the initial interface 104, as discussed above with respect to FIGS. 1 and 2A, a limited number of content items 108 for each category 128-168 may be displayed, such as based on sales ranking in each category, or various other metrics that may be selected by the user. However, as a user drills down in the interface 104 to subcategories and sub-subcategories, additional representations 108 corresponding to additional content items 106 may be displayed in the representation area 118. For example, in the case that the representations 108 correspond to sales ranking, additional representations 108 corresponding to content items 106 having lower sales ranking than those displayed in the previous versions of the interface 104 in FIGS. 1 and 2A may be included in interface 104 when particular subcategories are displayed. As discussed above, the user may select one or more of the representations 108 to view additional information corresponding to the selected representation. For instance, a popup interface or label 180 may be displayed in response to the selection of one of the representations 108, as discussed above with respect to FIGS. 1 and 2A.

In the example of FIG. 2B, the interface 104 or any of the other interfaces discussed herein may include the ability for the user to select a period of time to which the selected metrics may apply. The user may select one of the time periods to be applied to the metric corresponding to the displayed representations 108, such as applying the metric over the past year 280, past month 282, past week 284, or any other suitable time period option. Alternatively, in some examples, the user may be provided with an entry box to enable entry of a desired time period, a range of dates, or the like. Accordingly, in the illustrated example, the sales ranking metric 212 is selected and thus the size of the representations 108 may correspond to the sales rank of each content item 106 relative to the other content items 106 corresponding to the other representations 108 displayed in the representation area 118 over the selected period of time, which in the illustrated example is the past week 284. Further, the selectable options, controls and features displayed in the interfaces herein, such as for selecting metrics, selecting time periods, selecting categories, and the like, may be included in any of the interfaces discussed herein, and are not limited to the specific examples illustrated.

The example of FIG. 2B further includes a color key (or pattern key) 286 for indicating to the user the meaning of the various different graphic effects, such as patterns or colorations of the representations 108. In this example, the color key 286 indicates that the light vertical line hatching pattern (bright red 202) corresponds to a minus 5% or greater change in the metric, dark vertical line hatching pattern (dark red 204) corresponds to a minus 2% change in the metric, black 206 corresponds to a 0% change in the metric, dark diagonal crosshatching (dark green 208) indicates a plus 2% change in the metric, and light diagonal crosshatching (bright green 210) indicates a plus 5% or greater change in the metric. In this example, the color key 286 corresponds to a rate of change in the selected metric i.e., sales ranking 212. The percentages above are merely examples for discussion purposes, and any other suitable percentages may be used in other examples.

Additionally, in other examples, a different metric may be represented by the coloration, patterns or other graphic effects of the representations 108. For example, the user may select any of the other metrics described herein, such as most annotated 218, user review rating 222, and so forth, to be represented by the coloration or patterns of the representations 108. Thus, in the case that user review rating 222 is selected, bright red 202 may indicate a one star rating, dark red 204 may indicate a two star rating, black 206 may indicate a three-star rating, dark green 208 may indicate a four-star rating, and bright green 210 may indicate a five-star rating, such as on a five-star rating scale.

In addition, the interface 104, and/or the other interfaces described herein, may include an option for a user to specify a price range, a maximum price, a minimum price, or the like, for content items related to the information displayed in the representation area 118. For example, suppose that the user desires to pay no more than $5 for a content item. As indicated at 290, the user may select an option to filter the representations in the representation area 118 based on price. Further, as indicated at 292, in some examples, the user may be able to enter a desired price limit or price range. In other examples, a dropdown menu or other functionality may be provided by the interface to enable the user to specify a price limit or price range. Thus, when the user has specified a maximum price limit, such as $5, the representations 108 presented in the representation area may correspond only to content items that are priced at or below $5, i.e., below the specified price limit (or within the specified price range) in addition to any other filters or selections made by the user.

Additionally, the interface 104 and/or the other interfaces described herein may include an option for a user to specify a reading level of the content items corresponding to the representations 108 displayed in the representation area 118. For example, as indicated at 294, the user may select an option to specify the reading level of the content items, such as 6-12, 12-18, college level, etc. Further, as indicated at 296, the interface 104 may include a dropdown menu or other functionality to enable the user to specify a particular reading level for the content items. Thus, when the user has specified a particular reading level, the representations 108 presented in the representation area 118 may correspond only to content items 106 that are classified as being within the specified reading level, in addition to any other filters or selections made by the user. For instance, the content provider may maintain sufficient metadata for the content items 106 to enable identification of the reading level of each content item 106.

Furthermore, the interface 104, and/or the other interfaces described herein, may include an option for a user to specify a level of adult content of the content items corresponding to the representations 108 displayed in the representation area 118. For example, as indicated at 298, the user may select an option to specify the level of adult content in the content items. Further, as indicated at 299, the interface 104 may include a dropdown menu or other functionality to enable the user to specify a particular level of adult content for the content items. Thus, when the user has specified a particular adult content level, such as no adult content, moderate adult content, erotica, etc., the representations 108 presented in the representation area 118 may correspond only to content items 106 that are classified as being within the specified level of adult content, in addition to any other filters or selections made by the user. For instance, the content provider may maintain sufficient metadata for the content items 106 to enable identification of the amount of adult content in each content item 106.

Figure 3:
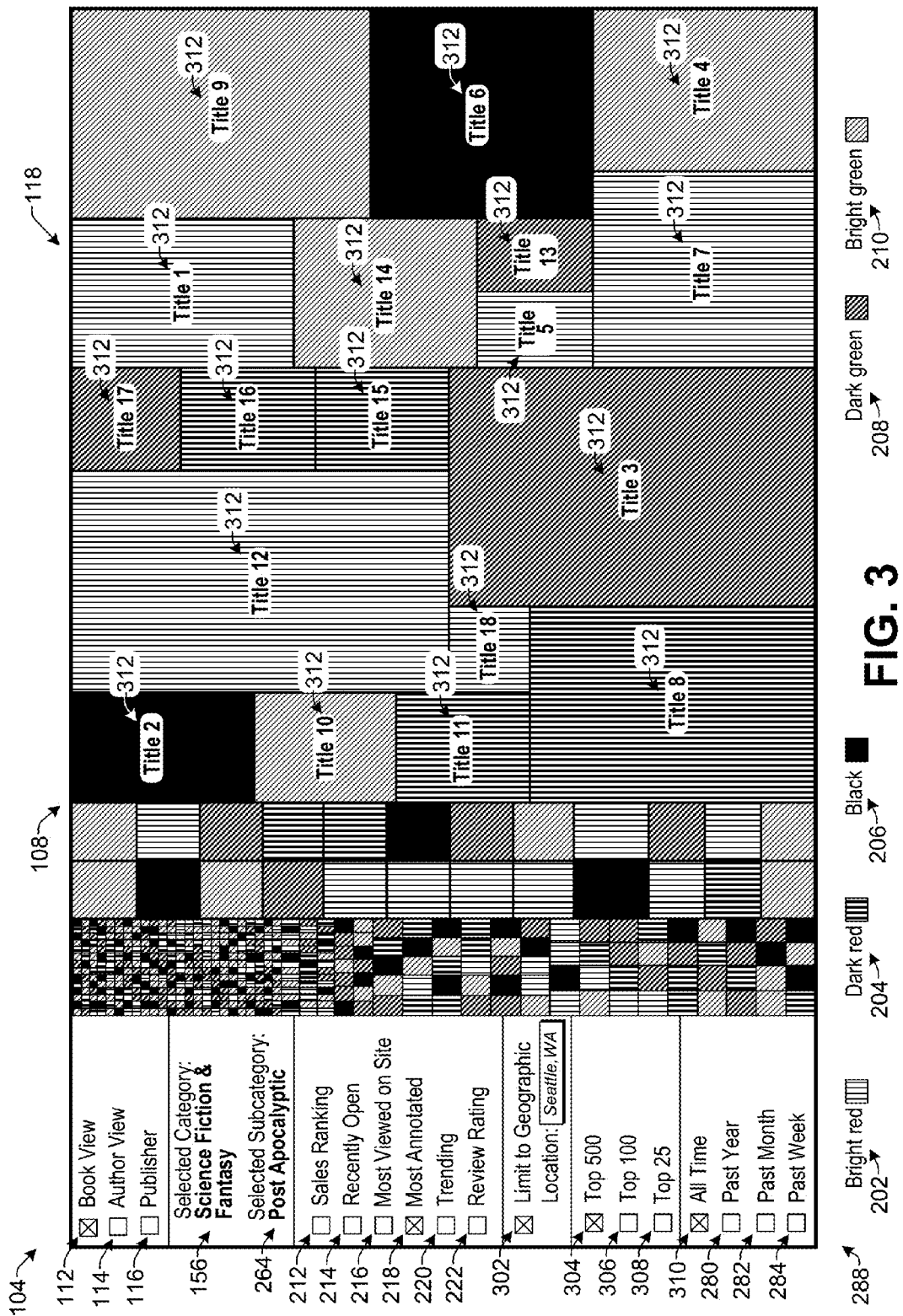
FIG. 3 illustrates an example interface for presenting information related to content items in a selected subcategory according to some implementations.

FIG. 3 illustrates an example of the interface 104 for presenting information related to a subcategory of content items according to some implementations. For example, suppose that the user has further selected the post-apocalyptic subcategory 264 from the interface 104 illustrated in FIG. 2B. In response, the interface 104 may present a plurality of representations 108 of content items that correspond to the selected subcategory 264, which is a subcategory of the main category science fiction & fantasy 156. In the illustrated example, the user has selected the "most annotated" metric 218 as the metric to be displayed by the representations 108 in the representation area 118. Accordingly, a size or area of each representation 108 may indicate a relative number of annotations made to instances of the corresponding content item by a plurality of users that have accessed the corresponding content item. For example, users may highlight a portion of the content item, enter notes or comments on the content item, place bookmarks at various locations in the content item and so forth. As mentioned above, this annotation information may be aggregated by the content provider to determine which content items are annotated more frequently or less frequently by a plurality of users over a period of time. Further, the fill or coloration of the representations 108 may indicate a rate of change of the metric 218, such as whether the corresponding content items are being annotated more frequently than in the past, less frequently than in the past, or at about the same rate.

As mentioned above, in some or all examples of the interfaces herein, the user may limit the information displayed to one or more specified geographic regions. Thus, as indicated at 302, in the illustrated example, the user has limited the displayed metric to a particular geographic location, which is Seattle, Wash., in this example. Accordingly, the information displayed in the interface 104 regarding the most annotated content items may be further limited to those content items that have annotated by users who are located in the Seattle, Wash. area. The other metrics discussed herein such as sales rankings 212, recently open 214, most viewed 216, trending 220 and user review rating 222 may be similarly limited to one or more specified geographic regions or locations. Additionally, in some examples, rather than entering text for a location, the user may select a metro area or other location from a menu, such as from a dropdown menu, a popup menu, a map, or the like.

Furthermore, in this example, the user may specify how many representations 108 are displayed in the representation area 118. Thus, the user may specify display of representations corresponding to the top 500 content items 304 for the selected subcategory, the top 100 content items 306, or the top 25 content items 308, as several examples. In the illustrated example, the user has selected the top 500 content items 304 to be displayed in the representation area 118. Accordingly, the representation area 118 includes 500 representations 108 corresponding to 500 different content items 106, with the representations 108 having various sizes and colorations according to corresponding values for the selected metric 218, while being limited to determining the metric values from data collected from the Seattle area. Furthermore, the user has selected a time period of all time 310, rather than the past year 280, past month 282 or past week 284. In addition, in this example, titles 312 of content items may be displayed in the representations 108 where a size of the representation 108 permits room for a legible title. Accordingly, based on a size of the display 102, a resolution of the display, or the like, titles 312 may be displayed in the representations 108, such as Title 1 through Title 18 in this example.

Figure 4A:
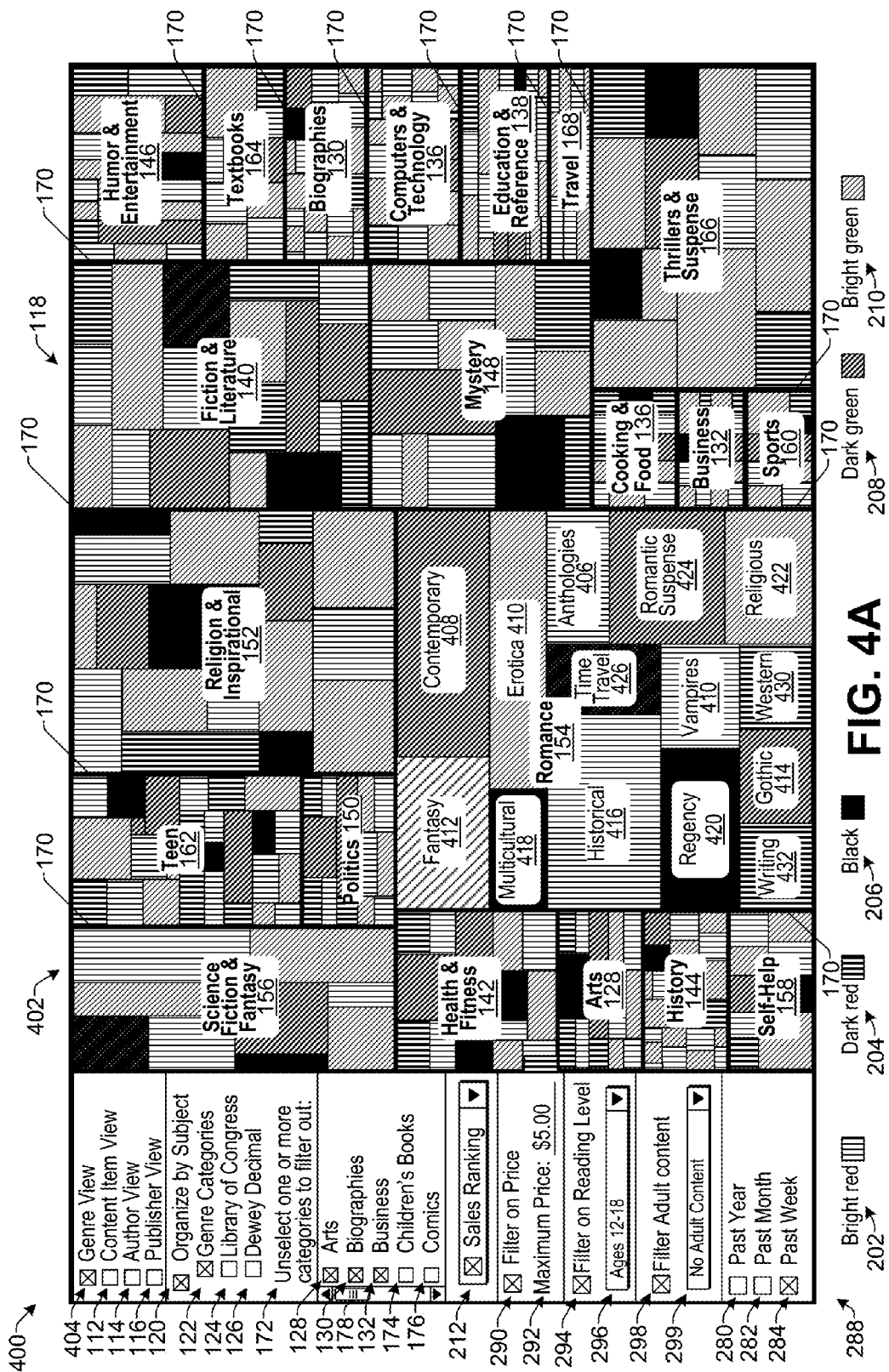
FIG. 4A illustrates an example interface for presenting information related to content items in which additional categories are represented according to some implementations.

FIG. 4A illustrates an example of an interface 400 for presenting information related to categories of content items having subcategories according to some implementations. In this example, at least some of the categories 128-168 may have subcategories. Thus, the interface 400 includes a plurality of representations 402 that represent additional categories or subcategories, such as subgenres of the category into which they are grouped. In this example, the names of the subcategories in the romance category 154 are shown for illustrative purposes, but the names of the subcategories in other categories may also be shown, depending on the display size, resolution, number of subcategories, sizes of the categories, sizes of the subcategory names, and the like. In addition, as indicated at 404, the user may select a genre view (i.e., category view) so that representations 402 of subcategories are presented, rather than representations 108 of content items, as would be the case if the content item view 112 were selected.

In the example of FIG. 4A, the romance category 154 is divided into a plurality of additional categories 406-432, such as anthologies 406, contemporary 408, erotica 410, fantasy & futuristic 412, gothic 414, historical 416, multicultural 418, regency 420, religious 422, romantic suspense 424, time travel 426, vampires 428, western 430 and writing 432. Further, the relative size of each representation 402 of a subcategory 406-432 relative to the other subcategories 406-432 may be proportional to a value of a selected metric, which in this example is sale ranking 212, i.e., how many content items in each subcategory have been sold within the past week. For instance, the contemporary romance category 408 and the historical romance category 416 may have recorded more sales than the gothic romance category 414 or the western romance category 430 within the past week.

Further, the representations 402 may have a graphic effect, such as being color-coded, having a pattern, or other graphic element to indicate a quality of a selected metric, or a value of different metric. For example, the erotica romance representation 410 in this example is colored a bright green or has a first pattern to indicate a substantial increase in sales over the previous week, while the vampires representation 410 may be colored bright red or may have a different, second pattern to indicate a substantial decrease in sales during the past week as compared with a previous week.

Alternatively, the graphic effect may represent a different metric for each subcategory, such as a number of each content item in the subcategory open on user devices within a period of time; a number of views of each content item in the subcategory on at least one website; a number of annotations made to each content item; a frequency with which each content item in the subcategory is mentioned on at least one online location; or a ranking of each content item in the subcategory based, at least in part, on user review ratings. Alternatively, in other examples, the graphic effect may not be included.

As discussed above, the user may zoom in on, select or otherwise enlarge one or more categories 128-168. For example, the user may select a particular category and view additional information within the selected category. The user may select a particular category by using the navigation and preference menu 288, as discussed above, or by selecting a particular category using an input device, a touch input, reverse pinch, or the like.

Figure 4B:
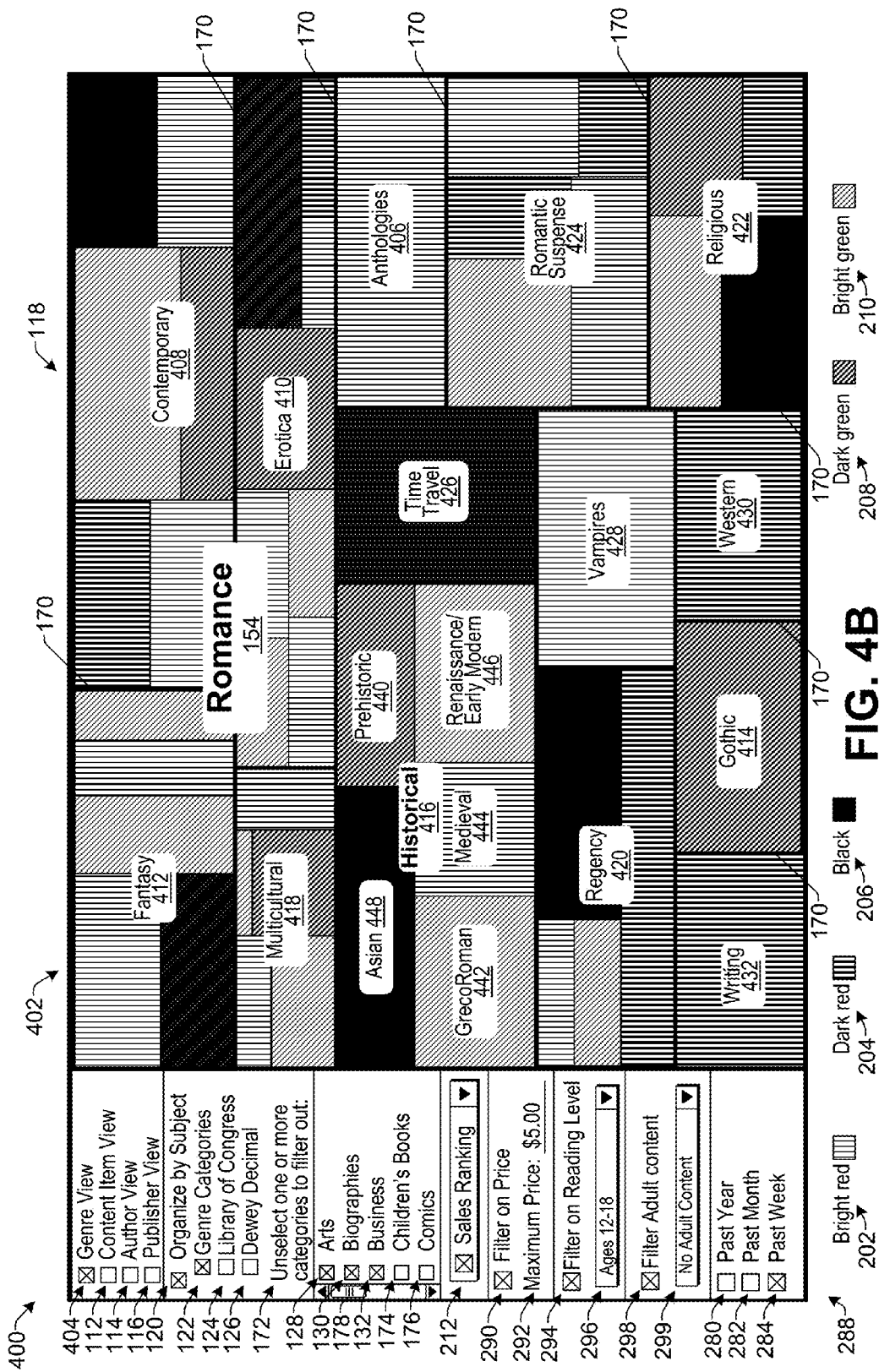
FIG. 4B illustrates an example interface for presenting information related to content items in a selected category in which additional categories are represented according to some implementations.

FIG. 4B illustrates an example of the interface 400 for presenting information related to a selected category of content items according to some implementations. In this example, the user has selected the romance category 154, and the categories (i.e., subgenres) in the romance category may be presented with additional information, such as additional categories (e.g., sub-subcategories). Thus, the historical romance subcategory 416 includes a plurality of additional categories such as a prehistoric category 440, a Greco-Roman category 442, a medieval category 444, a renaissance/early modern category 446 and an Asian category 448. In the case that the representations 402 are too small to include text, the user may rollover or select these representations 402 to view the titles of these categories, or else the user may zoom in on or select a category, such as the historical romance subcategory 416. The representations 402 of the categories 440-448 may be sized according to the respective values of the selected metric, and may include a graphic effect as discussed above. Further, some subcategories, such as vampires 428 and western 430 may not have additional categories.

Should the user desire to zoom in or advance further in the interface 400, such as by selecting or zooming in on the historical romance category 416, then in some examples, the user may be presented with additional categories. In other examples, such as when there are no additional categories, the user may be presented with representations 108 of content items in each of the sub-subcategories 448-446. In the later case, the user may be presented with an interface similar to that discussed above with respect to FIG. 3. Alternatively, in some cases, the user may deselect the genre view 404 and select the content item view 112 to be presented with an interface similar to that shown in FIG. 2B but with the subcategories 406-432 of FIG. 4B. Numerous other variations will be apparent to those of skill in the art in view of the disclosure herein.

Figure 5:
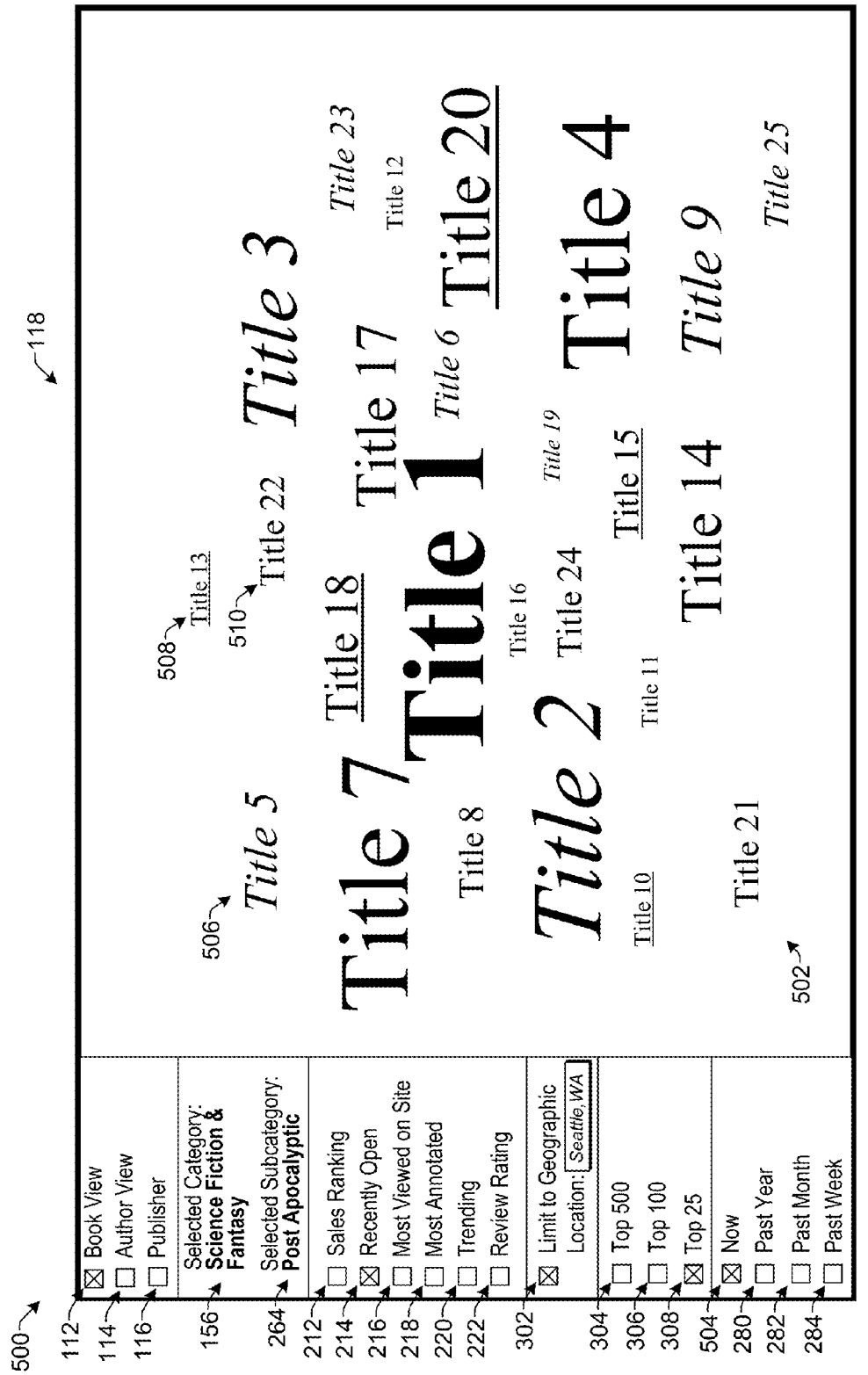
FIG. 5 illustrates an example interface for presenting information related to content items in a selected subcategory according to some implementations.

FIG. 5 illustrates an example of an interface 500 for presenting information related to a subcategory of content items according to some implementations. In this example, a plurality of representations 502 are included in the representation area 118 of the interface 500. Each representation 502 may be an identifier of a content item 106, such as a title of the content item 106. For instance, a size of the representation 502, such as a font size, may indicate a relative value of a selected metric with respect to the other content items represented in the representation area 118. In this example, as indicated at 308, the user has elected to display representations 502 for the top 25 content items corresponding to the selected metric. Further, the selected metric in this example is the "recently open" metric 214, which indicates how many instances of a particular content item have been recently open on a plurality of user devices 100. Further, in this example, the data displayed for the selected metric 214 is limited to the Seattle, Wash., geographic region as indicated at 302.

In addition, the time period for the selected metric 214 in this example may be "now," as indicated at 504. For example, the determination of what content items have been recently open on a plurality of user devices may be based on data collected over a recent period of time such as within the last several hours, or the like. Alternatively, the user may select other time periods, such as the past year 280, past month 282, or past week 284, to see an indication of content items 106 that have been open on user devices over those time periods. Similar to the examples discussed above, the user may select one of the representations 502 to view additional information about the corresponding content item 106, such as a synopsis of the content item, user review ratings, purchase information, or the like.

Furthermore, in this example, the representations 502 may also provide an indication of a rate of change of the selected metric over the selected period of time. For instance, when the representation title is in italics, as indicated at 506, this may indicate that there has been an increase in the rate of opening of the corresponding content item, whereas when the title is underlined, as indicated at 508, this may indicate that there has been a decrease in the rate of the opening of the corresponding content item on devices. When the title is neither italicized nor underlined, as indicated at 510, this may indicate that there has been no substantial change in the rate of users opening the content item on their devices. Alternatively, or additionally, the representations 502 may be color-coded, or have other graphic effects in the manner described above. For example, a bright green coloration may indicate a substantial increase in the rate of change of a selected metric, a bright red coloration may indicate a substantial decrease in the rate of change of the selected metric, and a black coloration may indicate little change over the time period for the selected metric. Various other gradations in coloration also may be provided in between the bright red and bright green extremes, such as darker red and darker green, as discussed above. Furthermore, while particular coloration schemes are described herein such as based on brightness, intensity, lightness, darkness, and so forth numerous other variations will be apparent to those of skill in the art in light of the disclosure herein. Accordingly, implementations herein are not limited to any particular graphic effects, such as color schemes, graphics schemes, text types, or the like.

Additionally, rather than identifiers of content items, in the author view 114, the representations 502 may be author names; in the publisher view 116 the representations 502 may be publisher names; and in term view, the representations 502 may be terms obtained from content items, as discussed below. Furthermore, the representations 502 may be arranged in the representation area 118 according to categories, such as a genre categories 122, Library of Congress categorization 124, Dewey decimal categorization 126, or any other suitable categorization or grouping for the respective content items, authors, publishers, or terms, as discussed above, such as with respect to FIGS. 1-4B.

Figure 6:
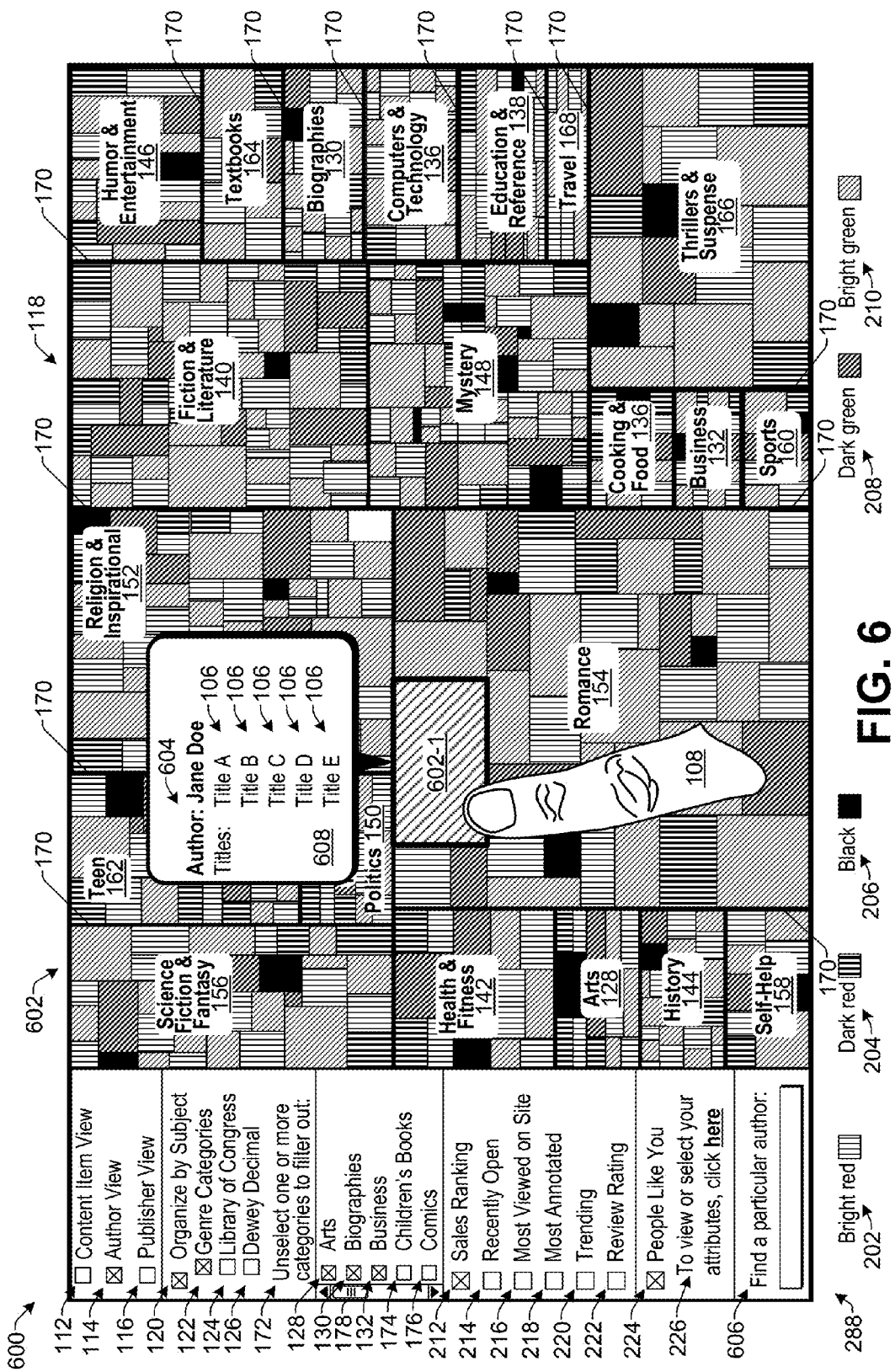
FIG. 6 illustrates an example interface for presenting information related to authors or publishers of content items according to some implementations.

FIG. 6 illustrates an example interface 600 for presenting information related to authors of content items or publishers of content items according to some implementations. In this example, suppose that the user has selected the author view 114. Accordingly, a plurality of representations 602 may be displayed in the representation area 118, with each representation 602 corresponding to a different author 604 of at least one content item 106. Similar to the examples discussed above, a size of each representation 602 may correspond to a particular metric selected for the interface 600 with respect to a particular author 604. The selectable metrics may be the same or similar to those discussed above, such as sales ranking 212, recently open 214, most viewed on the site 216, most annotated 218, trending 220, and/or user review rating 222. Furthermore, the representations 602 may be arranged according to various categories, such as a genre categories 122, Library of Congress categorization 124, Dewey decimal categorization 126, or any other suitable categorization or grouping. Accordingly, the representations 602 in a particular grouping may be grouped together and each grouping may be delineated by boarder lines 170.

Furthermore, the user may customize or personalize the representations 602, such as by selecting a "people like you" option 224 that limits the representations 602 displayed in the representation area 118 to data correlated to other users sharing at least one attribute with the current user. For example, if sales ranking 212 is selected as a metric for the representation 602, the calculation of total sales for a particular author may only be counted for people who share a specified attribute with the current user. Furthermore, as indicated at 606, the user may enter an author name into a search window to locate a representation 602 that corresponds to a particular author 604.

As one example, a user may select one of the representations 602 such as representation 602-1. For instance, the user may tap on, click on or otherwise indicate a selection of the representation 602-1 in the interface 600, which may result in the selected representation being highlighted or otherwise visually distinguished from the other representations 602. The selection of the representation 602-1 may also result in the display of a pop-up window, interface or label 608. The label 608 may include the name of the author 604, and an identification of one or more content items 106 that have been written by the selected author 604. For example, label 608 may list the title of each content item 106 written by the corresponding author 604. Thus, the size of the representation 602 may correspond to a metric for all of the content items 106 of an author, such as, in this example, a sales ranking 212 over a period of time of all of the content items 106 written by an author 604. Furthermore, as discussed above, the representation 602 may include a fill pattern, coloration or other graphic effect to indicate at least one of a rate of change of a selected metric or, alternatively, a value of a different metric. For instance, in some cases, the fill may indicate whether sales of the corresponding author have increased or decreased over the period of time. In other cases, the fill may indicate a different metric, such as reviews of the author's work, whether the author or the author's works are trending, or any of the other metrics described herein.

Additionally, in some examples, the representation area 118 may include multiple representations 602 for the same author 104, such as in different category groupings. For example, an author 104 may have written one or more content items in a first category, such as romance 154, and the same author 104 may also have written one or more other content items 106 in a different category, such as fiction & literature 140. Thus, the number of representations displayed for a particular author may depend on the categorization scheme applied to the interface 600 and the types of content items 106 written by the author.

In other examples, the representations 602 of authors may not be grouped according to categories. For example, the user may deselect the "organize by subject" option at 120. In this case, the representations 602 may be presented in the representation area 118 based on relative size, such as for a selected number of representations, as discussed above, but not further organized or categorized. For example, the user may wish to view the top 25 bestselling authors over the past week, regardless of category or genre. Further, the user may still filter out authors of content items in certain categories, such as by selecting or deselecting from the list of categories in the menu 288. Any of the other selection, filtering and preference options discussed herein may also be applied, such as price, reading level, adult content level, geographic location, user attributes, and the like.

The user may similarly select the publisher view 116 to view a plurality of representations 602 in which each representation may correspond to a different publisher. As with the author view 114, when a publisher publishes works in multiple categories, there may be multiple representations for a particular publisher, such as one in each different category in which the publisher publishes content items. Alternatively, there may be a single representation for each publisher, and an area of each publisher representation may be divided according to categories in which the publisher publishes content items, with a relative size of each category corresponding to a selected metric 212-222, and a fill of each category corresponding to a rate of change of the metric, or a corresponding to a different metric.

Figure 7:
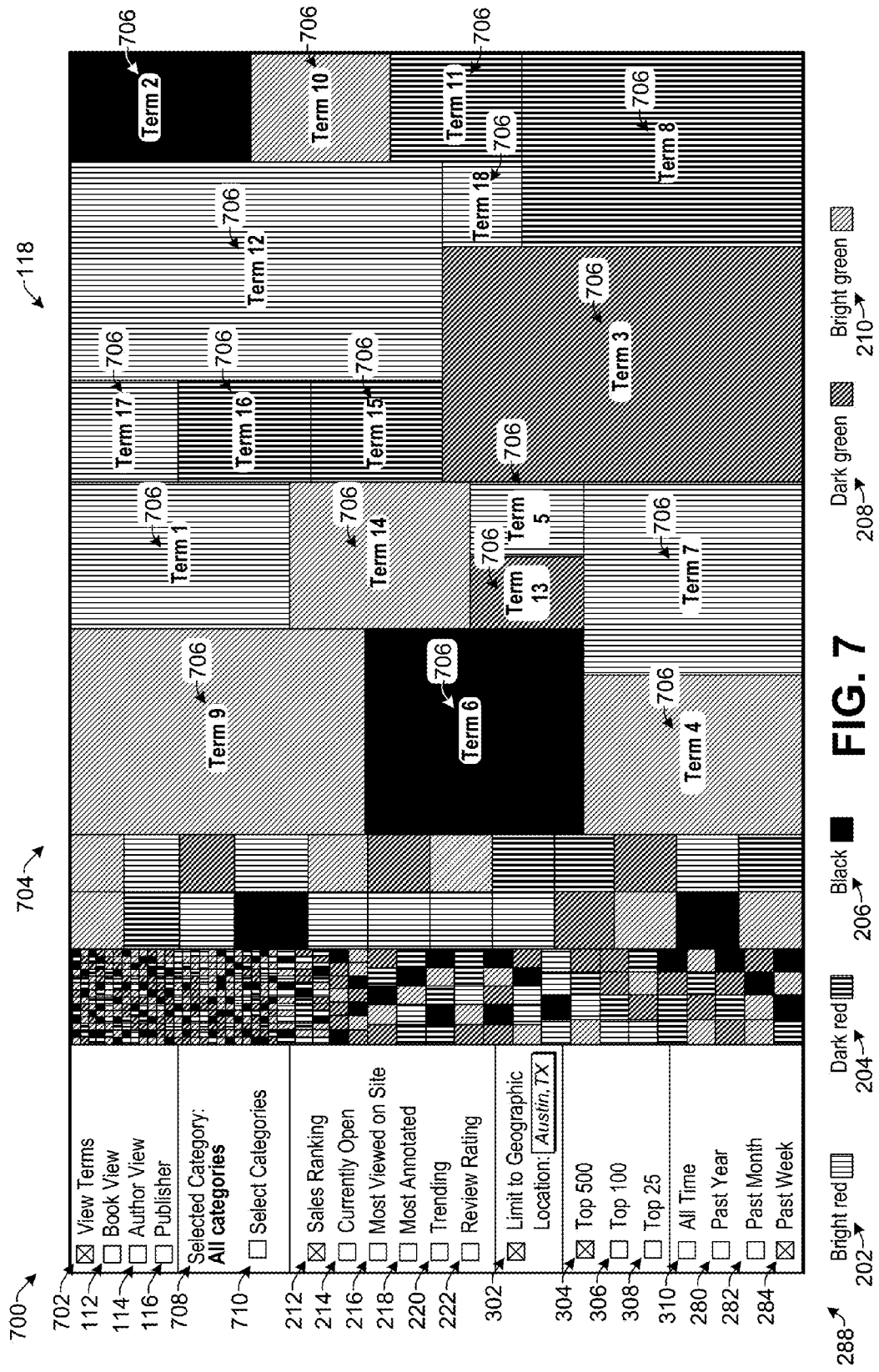
FIG. 7 illustrates an example interface for presenting information related to terms associated with content items according to some implementations.

FIG. 7 illustrates an example of an interface 700 for presenting information related to terms associated with content items according to some implementations. For example, the content provider may identify interesting terms contained in each content item of a plurality of content items. In some examples, the content provider may offer thousands or hundreds of thousands of content items 106 for sale, licensing, or other acquisition by members of the public. The content provider may identify one or more significant or interesting terms in each content item 106 that may be of interest to users of electronic devices 100. The content provider may correlate these terms with metrics for the associated content items 106, such as total sales of the content item, content items recently open on devices, etc., as discussed above. Additional details of identifying terms in particular content items 106 are discussed below with respect to FIGS. 9 and 10.

The interface 700 may be configured to display representations of identified terms in various different configurations, such as according to category, according to various metrics, and combinations thereof. In the illustrated example, the user has selected the view terms option 702, which results in the display in the representation area 118 of a plurality of representations 704 corresponding to a plurality of terms 706. In some examples, where display size and screen resolution permits, the terms may be displayed with the representation 704 such as in the case of term 1 through term 18 in the illustrated example. As with the other examples discussed above, the terms 706 may be displayed based on one or more selected metrics, such as metrics 212-222 or other suitable metrics. In this example, the metric 212 for sales ranking is selected and, accordingly, a size or area of the representations 704 may correspond to a number of content items 106 sold during a selected period of time that contain the particular term. For instance, in the illustrated example, the interface 700 is configured to display the top 500 terms contained in content items sold during the past week. Furthermore, in this example, the user has configured the interface 700 to limit the consideration of the terms 706 to content items 106 sold in a geographic location limited to Austin, Tex., as indicated at 302. Furthermore, the user may be provided with an option as indicated at 708 to group the terms according to one or more categories of content items as discussed above, such as genre categories, Library of Congress categories, Dewey decimal system categories, or the like. Accordingly, as indicated at 710, the user may select one or more categories to which to limit the terms being displayed for example, if the user selects romance, the terms 706 displayed may correspond to terms contained in content items 106 categorized in the romance category and sold within the past week. Furthermore, a fill pattern or color of the representations 704 may indicate at least one of a rate of change of a value of a selected metric over the period of time with respect to a term or, alternatively, a different metric with respect to the term over the period of time. Additionally, rather than displaying the rectangular representations 704, the interface 700 may display the text of the terms themselves in a manner similar to that discussed above with respect to FIG. 5. Numerous other interface configurations for displaying terms extracted from content items 106 will be apparent to those of skill in the art in light of the disclosure herein.

Figure 8:
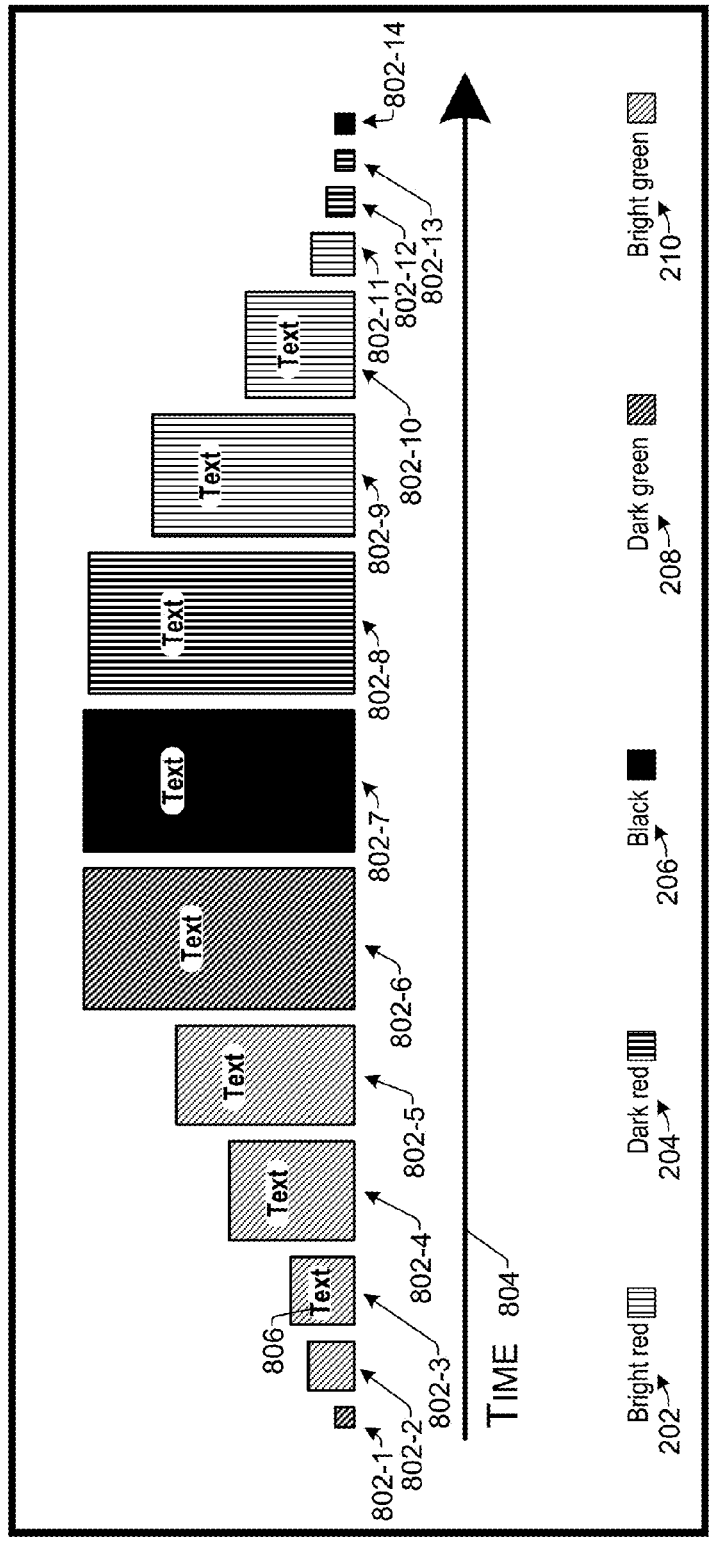
FIG. 8 illustrates an example timeline for animating information related to a content item according to some implementations.

FIG. 8 illustrates an example of animation of the representations in the interfaces herein according to some implementations. For example, the interfaces 104, 400, 500, 600 and/or 700 may be animated to show the representations therein changing over a period of time. Accordingly, while FIG. 8 illustrates an example of possible change in a single representation 802 over time, it should be understood that multiple representations or all of the representations contained in the interfaces herein may be animated contemporaneously to show how they change over a period of time. Accordingly, a timeline 804 represents a change in time from left to right in FIG. 8, and the representation 802 may correspond to any of the representations described herein, such as representations 108, 402, 502, 602, 704, or others. Furthermore, in this example, the animation pertains to a particular metric, such as sales over a period of time. For example, each representation instance 802-1, . . . , 802-14 my represent a particular time period, such as a day, week, month, etc. Further, the appearance of other representations with respect to other metrics may differ substantially during animation from the example shown in FIG. 8.

Thus, the animation may proceed from left to right, starting with a small representation 802-1, which changes in size as time progresses to reflect increasing sales of the corresponding content item 106. For example, sales of the content item may peak at the time period corresponding to the representation 802-7, and then may begin to recede, as indicated from 802-8 through 802-14. Accordingly, in this example, the size of the representation 802 may represent the number of units of the content item sold during that particular time period relative to number of units sold during the other time periods. Furthermore, a fill pattern, color or other graphic effect of the representation 802 may indicate whether the sales are increasing, stagnant, or decreasing. For example, bright green 210 may indicate a rapid increase in sales during the time period, over a previous time period, dark green 208 may indicate a less rapid increase in sales, black 206 may indicate the rate of sales did not increase or decrease substantially over previous time period, dark red 204 may indicate a decrease in sales rate over previous time period and bright red 202 may indicate a rapid decrease in sales rate over previous time. Accordingly, both the change in size and the change in pattern or color of the representation 802 may be animated in the interfaces herein.

Furthermore, when the representation 802 has reached a size sufficient for text 806 to be contained within the representation 802, text 806 may be included. For example, the text may be a title of a content item 106, a name of an author 604, a name of a publisher, a term 706, or the like. Additionally, as the size of the representation decreases, the text 806 may be removed from the representation 802 when the text would no longer be legible if contained within the representation. Numerous other variations will be apparent to those of skill in the art in light of the disclosure herein.

Example Architecture

Figure 9:
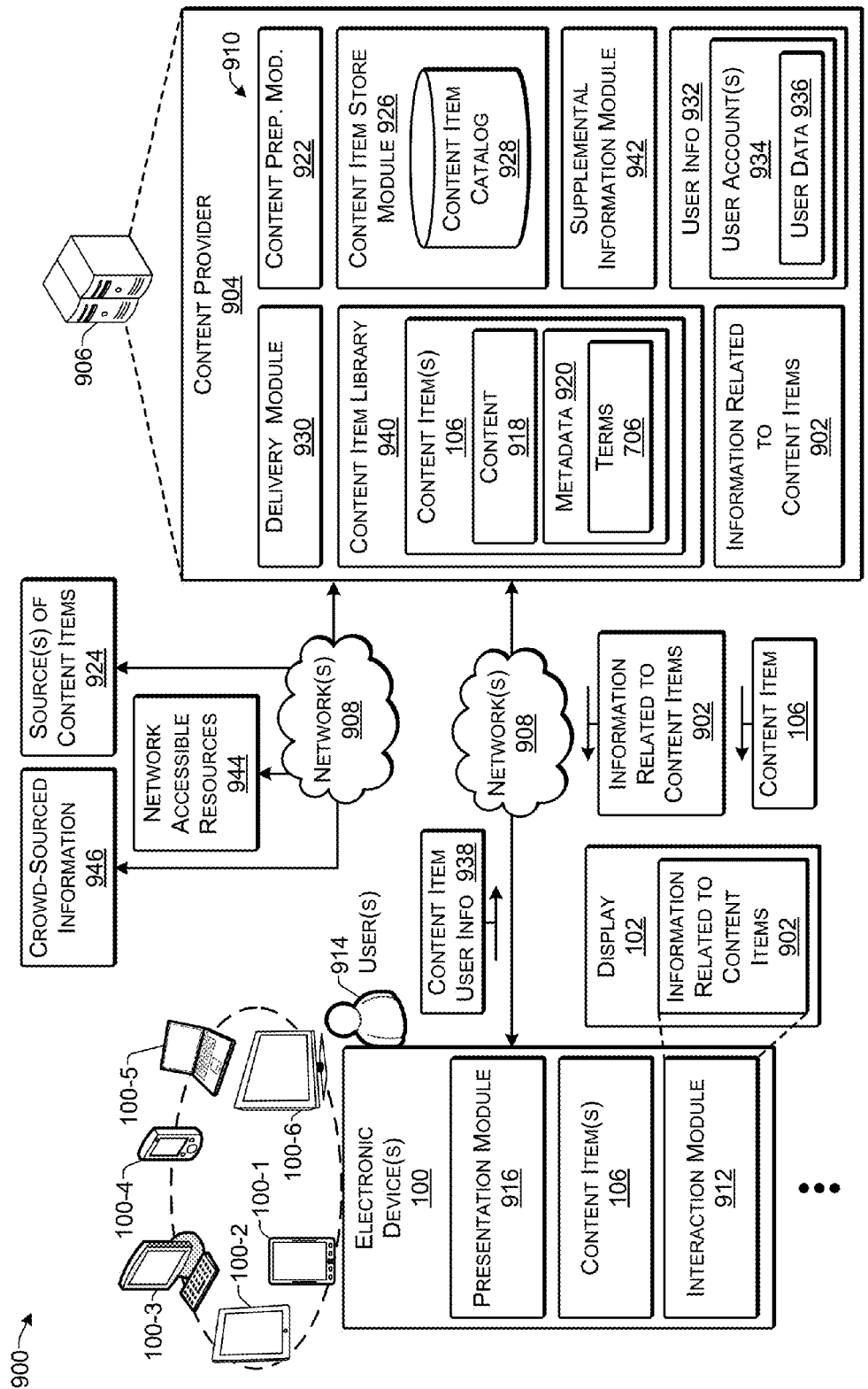
FIG. 9 illustrates an example system architecture for providing information related to content items according to some implementations.

FIG. 9 illustrates an example architecture of a system 900 to provide content items and to provide information related to content items according to some implementations. In some examples, information 902 related to content items 106 may be presented by one or more electronic devices 100 capable of displaying, rendering or otherwise presenting the information 902, such as on the associated display 102. Some examples of the information 902 include the interfaces 104, 400, 500, 600 and 700 discussed above. Some examples of the electronic device(s) 100 may include digital media devices and eBook readers 100-1; tablet computing devices 100-2; desktop, terminal and workstation computing devices 100-3; smart phones and mobile devices 100-4; laptop and netbook computing devices 100-5; televisions, gaming systems, and home and automotive electronic devices 100-6; and any other device capable of accessing and rendering or playing content items, online content, mobile content, web content, multimedia content, or the like.

In the illustrated example, the electronic device 100 is able to communicate with a content provider 904. For instance, the electronic device 100 may communicate with one or more computing devices 906 of the content provider 904, to access or receive information 902 related to content items over one or more networks 908. For example, the network(s) 908 may include a local area network (LAN), a wide area network (WAN), such as the Internet, or any combination thereof, and may include both wired and wireless communication technologies using any suitable protocols and communication techniques. The computing device 906 of the content provider and the electronic device 100 may communicate and interact with one another using any combination of suitable communication and networking protocols, such as Internet protocol (IP), transmission control protocol (TCP), hypertext transfer protocol (HTTP), and so forth. Additionally, in some cases, the electronic device 100 may download one or more content items 106 from the content provider 104, stream one or more content items 106, or the like.

In some examples, the content provider 904 may maintain an online location or site 910, such as a merchant website, an e-commerce site, or other functionality that may offer one or more content items 106 to the public, and that further provides the information 902 related to content items. For example, the content provider site 910 may be hosted on one or more of the computing devices 906. In some cases, the host computing devices 906 may be one or more web servers located at a data center, server farm, or other single physical location. In other cases, the content provider site 910 or portions thereof may be located in diverse locations that are physically remote from one another. Further, in some implementations, the content provider site 910 may be a group of websites, data stores, services, and the like, hosted on a plurality of different host computing devices 906 in a plurality of diverse locations, or hosted by one or more host computing devices 906 at a single location.

In some implementations, the content provider site 910 may offer the information 902 about content items to the public through an online presence accessible by a web browser or other application. In some examples, the content provider site 910 alternatively, or additionally, may provide the information 902 through an online or mobile application executing on the electronic device 100. For example, an application on the electronic device 100 may connect to or obtain the information 902 from the content provider site 910, such as to enable the selection, purchase or management of one or more content items 106, and the like. Thus, the content provider site 910 may enable the electronic device 100 to access the information 902 through an online or mobile application executing on a mobile electronic device 100, such as an eBook reader, smart phone, tablet computing device, augmented reality device, or the like. Accordingly, the content provider site 910 is not limited to a website accessed by a browser, but may encompass other technologies for marketing content items 106 and providing information 902 about content items, such as through in-application shopping, and the like.

The electronic device 100 may include an interaction module 912, which in some instances may be an application, such as a web browser, mobile application, or other module or computer program configured to receive web content, webviews, online content, or the like, for accessing and interacting with one or more modules of the content provider 904. For example, the interaction module 912 may enable a user 914 to receive the information 902 while browsing or shopping for content items at the content provider site 910. The interaction module 912 may further enable the user 914 to access or receive content items 106 from the content provider site 910, such as by downloading through the network 908. Further, in some implementations, the interaction module 912 may enable the user 914 to organize or manage the content items 106 on the electronic device 100. Additionally, while FIG. 9 illustrates an example user 914 and electronic device 100, the described techniques can of course be used with any number of users 914 and electronic devices 100. In addition, a single user 914 may use a plurality of electronic devices 100.

In some examples, the electronic device 100 may further include a content item presentation module 916 and one or more content items 106. In some implementations, the presentation module 916 and the interaction module 912 may be separate modules or applications. In other implementations, the presentation module 916 and the interaction module 912 may both be part of the same application or computer program for accessing and presenting information 902 and content items 106 on the electronic device 100. In yet other implementations, the presentation module 916 and the interaction module 912 may represent different functionalities of the same module.

Further, in some examples, each content item 106 may include content 918 and associated metadata 920 that is associated with the particular content item 106, such as in one or more metadata files. In some examples, the metadata 920 may include the terms 706 extracted from the content item 106, as discussed above with respect to FIG. 7, and as discussed additionally below. In some examples, the metadata 920 may be contained in a separate file from the content 918, while in other examples the metadata 920 may be combined with the content 918 into a single file.

The interaction module 912 may present one or more interfaces for displaying information 902 related to content items. Thus, the interaction module 912 may render and display the interfaces 104, 400, 500, 600 and/or 700. For instance, in some cases, the interfaces 104, 400, 500, 600 and/or 700 and associated graphic effects may be generated using any of HTML (hypertext markup language), JavaScript®, CSS (Cascading Style Sheets), widgets, or any combination thereof, or any other suitable technology or graphics rendering software.

In some implementations, each content item 106 may include the content 918, such as text, images, audio, video, or the like, and may further include the metadata 920 that is associated with the content 918. For example, the content provider 904, the author, the publisher, etc., may provide or may generate at least a portion of the metadata 920 for a corresponding content item 106. In some cases, the author or publisher may identify a genre or category for a content item, while in other cases, the content provider may perform this function. In some examples, the content provider 904 may generate the metadata 920 for a respective content item 106 to provide information related to the content 918 of the content item 106. For instance, the content provider 904 may include a content preparation module 922 that may receive a raw content item from one or more sources 924 of content items. The sources 924 of content items may be publishers, authors, movie distributors, studios, music companies, artists, and so forth. In the case of textual content items 106, the content preparation module 922 may parse and process the text of the raw content item to produce the content 918 that is compatible with various display formats, device platforms, and so forth. The content preparation module 922 may further parse and analyze a raw content item to produce at least a portion of the metadata 920 that corresponds to the content item 106.

The content provider site 910 may include a content item store module 926 that may provide or may access a content item catalog 928. For example, the content item store module 926 may present the content item catalog 928 to the interaction module 912 of an electronic device 100 that accesses the content provider site 910 such as during shopping for a content item 106. The content item catalog 928 may include searchable and/or browsable listings and descriptions of content items 106 available from the content provider site 910. The content item store module 926 may communicate with the interaction module 912 on the electronic device 100 to enable the user 914 to locate and acquire a content item 106 from the content provider site 910. In some examples, the content item store module 926 may provide the information 902 related to content items to an electronic device 100 that accesses the content item store.

The content provider site 910 may further include a delivery module 930 that may deliver (or make available for delivery) a content item 106 to the electronic device 100 and/or the user 914. For example, in some instances, the delivery module 930 may facilitate the download of a content item 106 to the electronic device 100 over the network(s) 908 following a purchase of access to the content item 106. In other instances, the delivery module 930 may provide for delivery of a hard copy of a content item 106 to the user 914, such as by delivery of a storage medium that maintains a copy of the content item, depending on the nature of the content item and the electronic device 100. The delivery module 930 may also expose programmatic interfaces or APIs (application programming interfaces) that electronic devices 100 can use to obtain content items 106 and related services, which may include information 902 related to content items.

Furthermore, in some implementations, the content provider 104 may maintain user information 932. For example, the user information 932 may include one or more user accounts 934, which may include user data 936, such as user contact information, a purchase history, a user content item library, information on various devices 100 associated with a particular user account, or other records relating to content items purchased by the user 914, as well as records of other transactions of the user 914 with the content provider 904. The user data 936 may further include other attributes of the user that the user may provide or that may be gleaned from interactions with the user 914. Thus, the user data 936 may enable the content provider 904 to customize or personalize the interfaces 104, 500, 600 and/or 700 for a particular user 914.

In some examples, the electronic device 100 may send user content item information 938 to the content provider 904 for inclusion with other information in the user's account 934. For instance, the user content item information 938 may include position information, such as a current position or furthest point of progress for each content item 106 accessed by the user 914. The user content item information 938 may further include annotation information related to any annotations, such as highlights, notes, comments, or bookmarks, made to the content item 106. The user content item information 938 associated with a particular user account 934 may be used to synchronize each content item 106 with other instances of a particular content item on other devices 100 associated with the particular user's account. Accordingly, the delivery module 930 of the content provider 904 may send synchronizing information to the other device(s) of the particular user so that when the user accesses the content item 106 on the other device, the other device may present the content item in the same position as when the user last accessed it on the first user device and with any annotations added by the user.

The content provider site 910 may also include or may access a content item library 940. For example, the content item library 940 may include a plurality of content items 106 that the content provider 904 has available for access by electronic devices 100, such as by purchase through the content item catalog 928. Each content item 106 in the content item library 940 may include both content 918 and metadata 920 corresponding to the content. In some examples, the content item library 940 may contain hundreds of thousands of unique content items 106, including a variety of eBooks, such as fiction, non-fiction, etc., and various other types of content items, examples of which have been enumerated above.

The content provider site 910 may further include a supplemental information module 942 that may be employed in some implementations for generating and managing supplemental information 942 that may be used to identify various categories of a content item and/or identify one or more significant terms 706 in the content item. The supplemental information module 942 may operate on the content items 106 in the content item library 940 to produce supplemental information that includes the terms 706. For example, the supplemental information module 942 may select a particular content item 106 from the content item library 940 for generating terms 706 for the particular content item 106. The supplemental information module 942 may parse and index the content item 106 by identifying characters, people, things, phrases, places, topics, organizations, themes, and so forth, which are of significance in the content item. In some examples, the supplemental information module 942 may access various authoritative sources of information, as well as performing statistical analysis and modeling to identify the significant terms 706 in the particular content item 106. Thus, during the parsing, the supplemental information module 942 may identify candidate terms that are candidates to make into the terms 706 for the content item. The supplemental information module 942 may identify proper names, place names, statistically improbable phrases, and the like, in the text of the content item. For instance, a statistically improbable phrase is a word or combination of words that occur in the text of a content item one or more times in a manner that is outside of a predetermined threshold. For example, if a particular phrase is used multiple times in a content item, while not being used, or being used rarely, in other content items in a corpus of content items, this may be a statistically improbable phrase that is a candidate to become a term 706 of the content item.

To determine which candidate terms to make into the terms 706, the supplemental information module 942 may access external sources of information outside the content item. For example, the supplemental information module 942 may access network accessible resources 944 that may include online sources of information, such as Wikipedia®, Shelfari® and IMDb®, online dictionaries, online encyclopedias, wikis, online reference sites, discussion forums, or other online resources, to determine identification of characters and other significant phrases, things, events, or places in a content item 106. Further, the supplemental information module 942 may obtain additional information on the statistically improbable phrases in the particular content item 106, such as by obtaining definitions or other information for these phrases from various locations, such as the authoritative sources mentioned above.

Furthermore, in some examples, the supplemental information module 942 may utilize or may access crowd-sourced information 946 for further identifying terms of a content item to make into the terms 706 of the content item. For example, websites such as Shelfari® may allow users to add crowd-sourced information related to characters, places, topics, etc., in a content item. Further, crowd-sourced information 946 may also include information received from users 914 of electronic devices 100 to correct errors in terms 706 of a content item 106. Users 914 may also assist in identifying alternate names for characters, identifying topics, identifying text related to themes, relationships, events, and interactions, and so forth. Additional details of generating the supplemental information 942 are described below with respect to FIG. 10. Supplemental information generated for each content item may include the terms 706 stored in the metadata 920 for the particular content item 106, or other suitable location.

Additionally, the supplemental information module 942 may aggregate the user content item information 938 collected from a plurality of users and a plurality of devices 100 associated with different user accounts. The supplemental information module 942 may determine which content items to identify as recently open on user devices 100, such as to provide information for the "recently open" metric 214 discussed above. The supplemental information module 942 may further aggregate annotation information included in the user content item information 938 to determine information for the "most annotated" metric 218 discussed above. Numerous other variations will be apparent to those of skill in the art in light of the disclosure herein.

Example Framework for Identifying Terms

Figure 10:
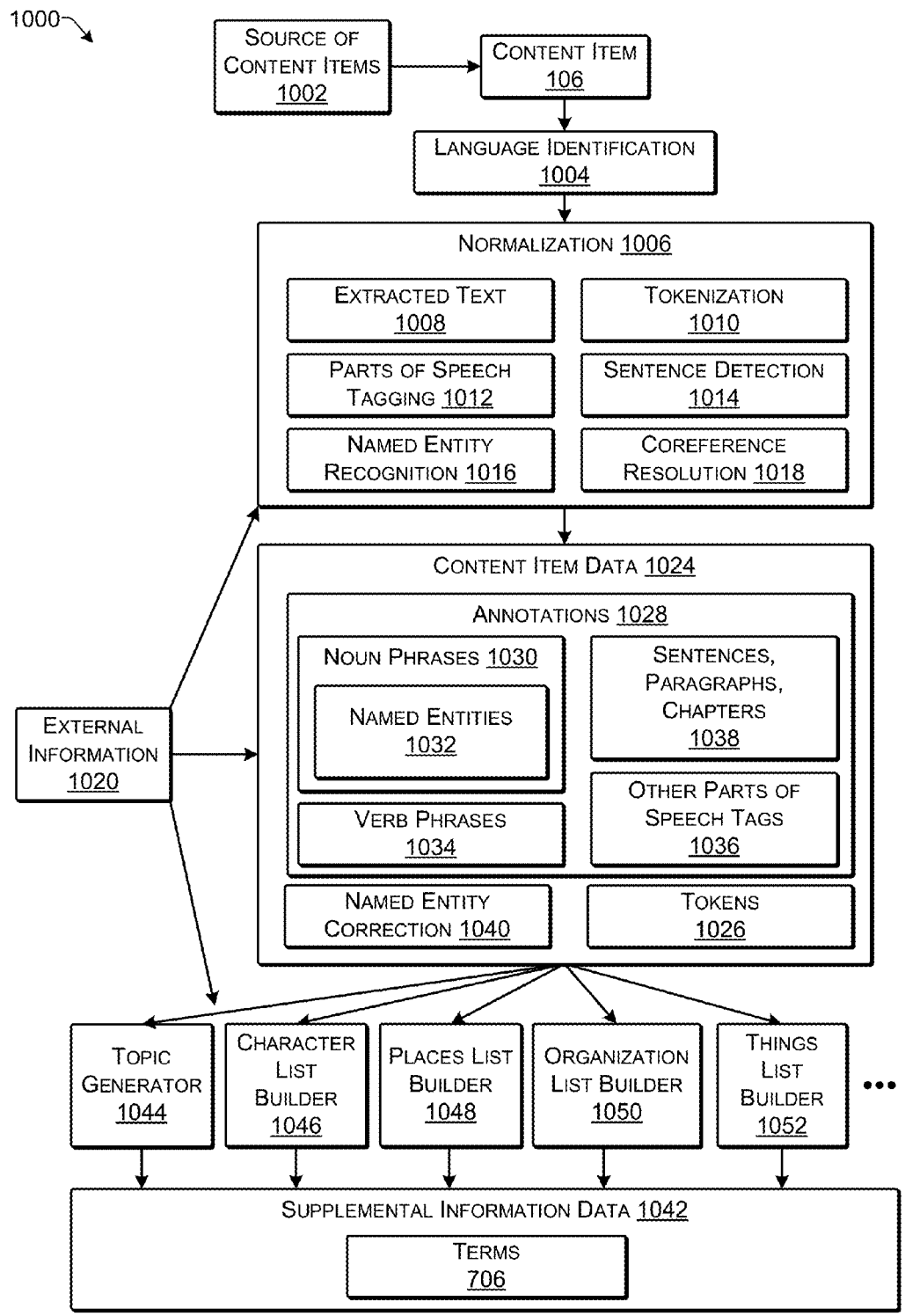
FIG. 10 illustrates an example framework for obtaining terms from a content item according to some implementations.

FIG. 10 illustrates an example framework 1000 that may be employed by the supplemental information module 942 of the content provider 904 for generating supplemental information data according to some implementations. The supplemental information may include one or more significant terms 706 identified in the content item, such as significant character names, topics, organizations, places, things and the like. In this example, the content provider 904 may receive a content item 106 from a source 1002 of content items, such as from a publisher, an author, the content item library 940, or other source of content items. The content item 106 may optionally undergo language identification, as indicated at 1004, to identify the language in which the text associated with the content item 106 is written. Further, since content items may be stored in a variety of different formats, the text of the content item 106 may be normalized, as indicated at 1006, by extracting the raw text from the content item 106 to obtain extracted text 1008. The normalization 1006 may include tokenization 1010 of the extracted text 1008 of the content item 106. Tokenization 1010 may include parsing the text of the content item into tokens that may include individual words, punctuation marks, symbols, etc., contained in the text of the content item 106, and associating location information with each token identified in the content item 106. Thus, each word or punctuation mark in the text of the content item 106 may be assigned a unique location sequence or value, such as based on an offset of the token from the beginning of the content item and a number of characters in the token, which may be referred to as the length of the token.

Furthermore, normalization 1006 may include, or may be followed by, parts of speech tagging 1012 and sentence detection 1014. Parts of speech tagging 1012 may include identification of parts of speech in the text of the content item 106, such as noun phrases, verb phrases, and various other parts of speech that may be of interest for identifying the categories of the content item discussed above. Thus, each token may be associated with at least one part of speech. In addition, sentence detection 1014 may include identifying sentences, paragraphs, and chapters contained in the content item 106.

Additionally, normalization 1006 may include, or may be followed by, named entity recognition 1016 and coreference resolution 1018. For example, named entity recognition 1016 may include recognizing entities in the content item, such as names of people, places, organizations, topics, certain numerical expressions, quantities, and so forth. For instance, proper nouns, such as names of people, places, organizations, and the like, may be identified based on various lists of names, or other techniques for detecting and distinguishing these separate types of entities. Furthermore, in some cases, external information 1020, that is external to the content item 106, may be employed to assist in named entity recognition, such as by referring to the network accessible resources 944 and/or crowd-sourced information 946 discussed above with respect to FIG. 9, or other suitable resources such as files or databases of names, nicknames, places, organizations, etc. In addition, coreference resolution 1018 may involve identifying occurrences in the content item 106 in which multiple different expressions or pronouns refer to the same thing in the content item 106.

The normalization 1006, including the operations described above, results in content item data 1024 that may include tokens 1026 and annotations 1028. The annotations 1028 may include noun phrases 1030, which may include for example, proper nouns for some named entities 1032, such as people/characters, places, organizations, as well as other nouns and noun phrases identified in the content item 106 for topics and the like. The annotations 1028 may further include verb phrases 1034 and other parts of speech tags 1036 identified in the content item 106. The annotations 1028 may further include information on sentences, paragraphs and chapters 1038 identified in the content item 106.

Additionally, in some instances, named entity correction 1040 may be performed for named entities 1032 identified in the content item data 1024. As one example, an employee of the content provider 904 may check the named entities 1032 in the content item 106 for accuracy. As another example, external information 1020 may be applied for checking the named entities 1032 in the content item data 1024. For example, the named entities 1032 for the content item 106 may be posted to a source of crowd-sourced information 944, which may be relied on for correcting any errors in the named entities 1032 for the content item 106. Thus, the named entities 1032 may be posted to a community website, such as Shelfari®, that includes a page or entry for the content item 106, and visitors to the community website may provide information to correct any errors in the named entities 1032, selected categories, or the like. As another example, users of electronic devices 100 who receive the supplemental information 942 with a content item may note an error in the supplemental information and may provide the external information 1020 used for named entity correction 1040. Accordingly, crowd-sourced information and crowd-sourced corrections may be used in some cases to perform named entity correction 1040.

The content item data 1024 may be used to generate supplemental information data 1042, which may include terms 706 identified in the content item 106. For example, a topic generator 1044 may employ external information 1020 to generate one or more topics from the content item 106. For example, the topic generator 1044 may generate a set of useful topics based on a detection of what the content item 106 is generally related to and, by extension, where to find more information about the identified topics, such as in the current content item or other content items. For example, the topic generator 1044 may access Wikipedia® or other network accessible resources 944 to determine which of the noun phrases 1030 or other terms identified in the content item 106 correspond to entries in Wikipedia® or other network accessible resources 944. Some examples assign ranks to candidate topics based in part on an analysis of links to the entry associated with each candidate topic. Any of various link analysis ranking techniques may be applied, such as the PageRank® algorithm, or other suitable link analysis algorithms and techniques for assigning a link-based rank to each topic. Thus, the links to a particular entry corresponding to a particular topic from other entries corresponding to other topics may be considered during ranking of the candidate topics.

Additionally, the contribution of a particular candidate topic to other candidate topics in the content item 106 may also be considered. This may be determined by calculating a contribution based on an analysis of links from an entry of a candidate topic to the other entries corresponding to the other candidate topics. A link analysis algorithm may also be adapted for making this determination. Thus, the candidate topics may be ranked based on the values of incoming and outgoing links of corresponding entries in the network resources, and those candidate topics having a rank below a certain ranking threshold may be pruned or otherwise removed from consideration. Further, other techniques may also be used to rank the connectedness of candidate topics. As one example, the ranking of the candidate topics may be based merely on the number of incoming and outgoing links for each candidate topic entry. Other variations will also be apparent to those of skill in the art in view of the disclosure herein.

In addition, in some examples, a term frequency-inverse document frequency (tf-idf) value may be calculated for each candidate topic to further refine the number candidate topics for a content item. For example, a very large corpus of textual works (e.g., thousands or hundreds of thousands of textual works) may be parsed into n-grams, e.g., one-word n-grams, two-word n-grams, three-word n-grams, four-word n-grams, and five-word n-grams. The frequency of occurrence of each n-gram in the corpus may be determined and normalized based on inverse document frequency. The frequency of the candidate phrases in the instant content item may then be compared with the frequency of those candidate phrases in the works of the overall corpus using tf-idf values. Candidate phrases having a tf-idf value that differs from the tf-idf value for that phrase in the corpus by less than a certain tf-idf threshold may be removed from consideration since they are likely common phrases that do not bear much importance to the subject of the content item 106. The candidate topics that remain may be designated as the set of "topics" for the instant content item 106. Thus, the topics so identified may be included in the terms 706 for the content item 106.

In addition, a character list builder 1046 may build a list of characters from the named entities 1032 in the content item 106 that are identified as corresponding to people or characters. For example, the names corresponding to people in the content item 106 may be identified, such as through lists of common names, presence of titles and suffixes, lists of nicknames, and so forth. The person names in the list may be further sorted according to the fullness of name, i.e., whether both first name and last name is provided, whether just a first name or just a surname is provided, whether a prefix or suffix is provided, etc.

The names may subsequently be clustered into name sets, and the names in the name sets may further be disambiguated. For example, characters are often referred to by multiple different names in a content item. As one example, the expressions "the tin man," the "Tin Woodman," "the Woodman," and "Nick Chopper" are all used to refer the Tin Woodman character in L. Frank Baum's series of Oz books. Accordingly, the character list builder 1046 associates these various different expressions or alternate names with a single character. In some instances, external information 1020 may be employed by the character list builder 1046, such as by referring to the network accessible resources 944 and/or crowd-sourced information 946 discussed above, or other suitable resources, such as files or databases of names, nicknames, places, organizations, etc.

The character list builder 1046 may use the clustered and disambiguated names to create characters for the content item including the locations of each occurrence of each character name in the content item. The character list builder 1046 may further determine which name to use as the representative or primary name for a particular character, such as based on a fullness or amount of information in the name. Accordingly, the character names identified in the content item may also be included in the terms 706 for the content item 106.

A places list builder 1048, an organizations list builder 1050, a things list builder 1052, and various other category builders may be employed to identify additional respective terms in the content item. For example, the places list builder 1048 may identify and cluster places that are the same, but that are referred to by different or alternate names, such as by clustering "the English Channel" with "the Channel," in a manner similar to that described above with respect to the character list builder 1046. The organizations list builder 1050 may use similar techniques to identify organizations, such as corporations, groups, teams, institutions, associations, clubs, societies, and so forth, discussed in the content item. Further, the things list builder 1052 may identify things that are believed to be important to the particular content item. For example, such things of significance for a particular content item may be identified for fiction works in a manner similar to topics identified for non-fiction works, as well as, or alternatively, from crowd-sourced information 946. Other term builders may be included for various other types of term categories such as themes, scenes, events, interesting or popular phrases, citations, relationships between characters, interactions between characters, time periods, and so forth. Accordingly, the supplemental information data 1042 may include terms 706 that have been identified by the topic generator 1044, character list builder 1046, places list builder 1048, organization list builder 1050, things list builder 1052, and so forth. Additional examples of structures, techniques and user interfaces for generating and providing supplemental information and terms 706 are described in U.S. patent application Ser. No. 13/433,028, filed Mar. 28, 2012, and Ser. No. 13/431,838, filed Mar. 27, 2012, the entire disclosures of which are incorporated herein by reference.

Example Electronic Device

Figure 11:
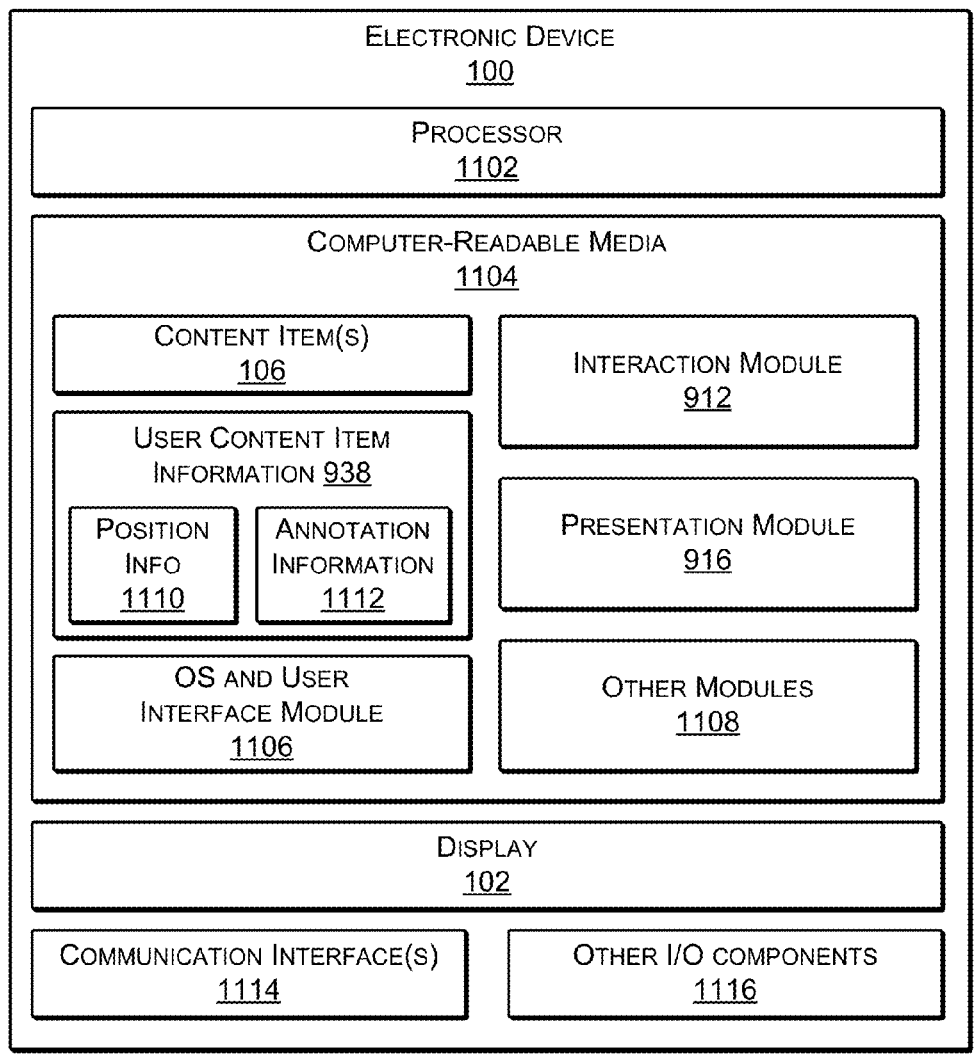
FIG. 11 illustrates select components of an example electronic device according to some implementations.

FIG. 11 illustrates select example components of the electronic device 100 that may be used to implement the functionality described above according to some implementations. In a very basic configuration, the electronic device 100 includes, or accesses, components such as at least one control logic circuit, central processing unit, or processor 1102 and one or more computer-readable media 1104. Each processor 1102 may itself comprise one or more processors or processing cores. Depending on the configuration of the electronic device 100, the computer-readable media 1104 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1102 directly or through another computing device. Accordingly, the computer-readable media 1104 may be computer-readable media able to store and maintain instructions, modules or components executable by the processor 1102.

The computer-readable media 1104 may be used to store any number of functional components that are executable by the processor 1102. In some implementations, these functional components comprise instructions or programs that are executable by the processor 1102 and that, when executed, implement operational logic for performing the actions attributed above to the electronic device 100. Functional components of the electronic device 100 stored in the computer-readable media 1104 may include the interaction module 912, executable by the processor 1102 for obtaining and presenting information 902 related to content items, such as for presenting one or more interfaces 104, 400, 500, 600 and 700, as discussed above. Additional functional components stored in the computer-readable media 1104 may include the presentation module 916, as described above, which may be executed by the processor 1102 for presenting one or more content items 106. Other functional components may include an operating system and user interface module 1106 for controlling and managing various functions of the electronic device 100. Depending on the type of the electronic device 100, the computer-readable media 1104 may also optionally include other functional components, such as other modules 1108, which may include applications, programs, drivers and so forth.

The computer-readable media 1104 may also store data, data structures, and the like that are used by the functional components. For example, data stored by the computer-readable media 1104 may include the one or more content items 106. In some examples, the electronic device 100 may further include the user content item information 938 that is sent to the content provide, and which may include position information 1110, such as how far a user has progressed through each content item, and annotation information 1112 for annotations made to each content item. In some examples, the position information 1110 and annotation information 1112 may be stored with the metadata of each content item 106, while in other examples, this information may be stored in a separate location. The electronic device 100 may also maintain other data, which may include, for example, data used by the interaction module 912, data used by the operating system and user interface module 1106, and data used by the other modules 1108. Further, the electronic device 100 may include many other logical, programmatic and physical components, of which those described are merely examples that are related to the discussion herein.

FIG. 11 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interface components herein may be rendered in 3D.

One or more communication interfaces 1114 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1114 may allow a user of the electronic device 100 to access the World Wide Web, download content items from the content provider site 910, access online content, such as from a website or other network location, and the like. The communication interface 1114 may further allow a user to access storage on another device, such as a user's computing device, a network attached storage device, cloud storage, or the like.

The electronic device 100 may further be equipped with various other input/output (I/O) components 1116. Such I/O components may include a touchscreen and various user controls (e.g., buttons, a joystick, a keyboard, a mouse, etc.), speakers, a microphone, a camera, connection ports, and so forth. For example, the operating system 1106 of the electronic device 100 may include suitable drivers configured to accept input from a keypad, keyboard, or other user controls and devices included as the I/O components 1116. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth.

Example Computing Device(s)

Figure 12:
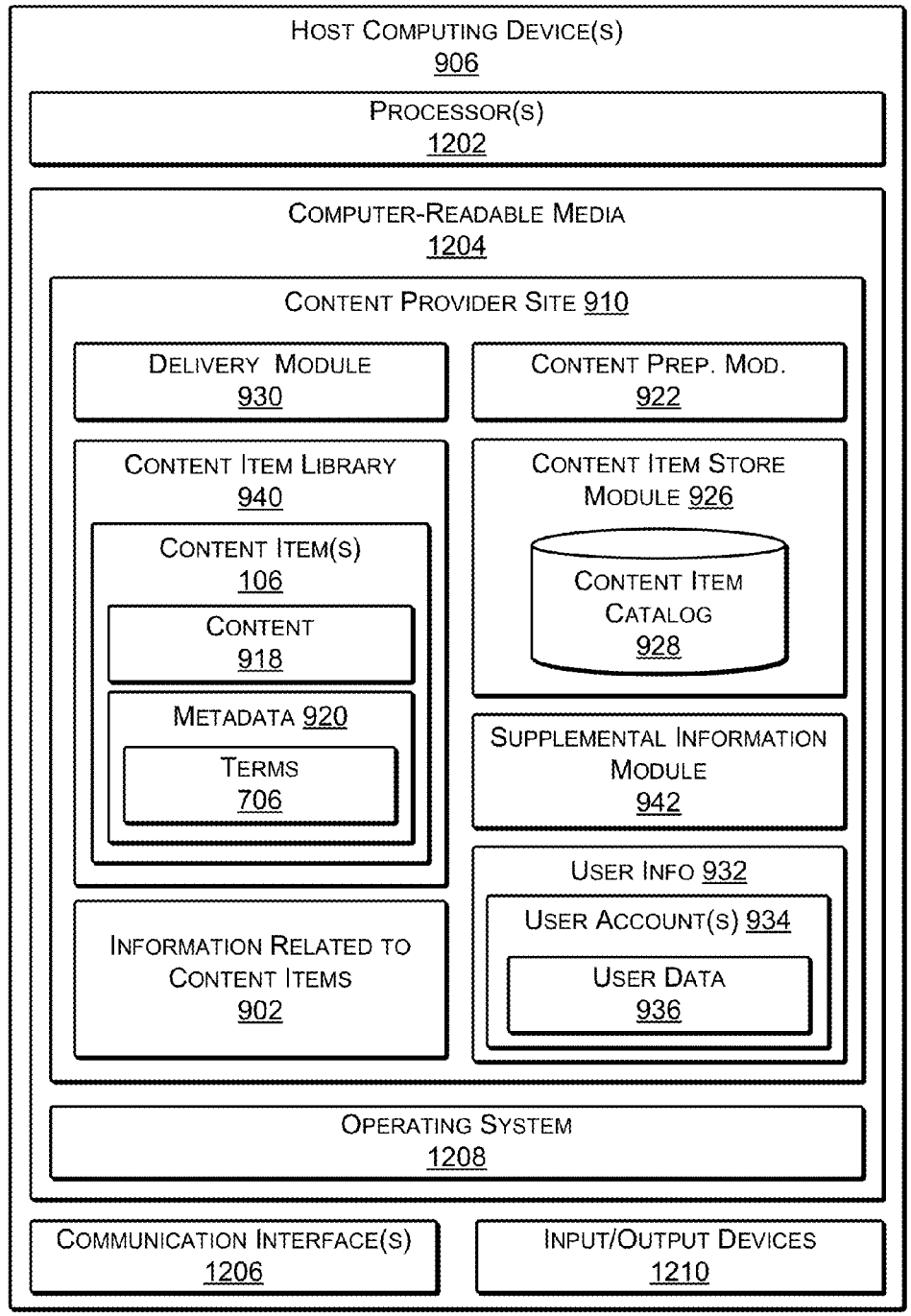
FIG. 12 illustrates select components of one or more example host computing devices of a content provider according to some implementations.

FIG. 12 illustrates select components of one or more host computing devices 906 that may be used to implement the functionality of the content provider site 910 according to some implementations. The content provider site 910 may be hosted on one or more servers or other types of computing devices that may be embodied in any number of ways. For instance, in the case of a server, the content provider site 910 may be implemented on a single server, a cluster of servers, a server farm or data center, a cloud hosted computing service, and so forth, although other computer architectures (e.g., a mainframe architecture) may also be used. Further, while the figures illustrate the components of the content provider site 910 as being present in a single location, it is to be appreciated that these components may be distributed across different computing devices and locations in any manner Generally, the content provider site 910 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 12, an example host computing device 906 includes one or more processors 1202, one or more computer-readable media 1204, and one or more communication interfaces 1206. The processor(s) 1202 may be a single processing unit or a number of processing units, and may include single or multiple computing units or multiple processing cores. The processor(s) 1202 can be configured to fetch and execute computer-readable instructions stored in the computer-readable media 1204 or other computer-readable media.

The computer-readable media 1204 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 906, the computer-readable media 1204 may be a type of computer-readable storage media and may be a tangible non-transitory storage media.

The computer-readable media 1204 may be used to store any number of functional components that are executable by the processors 1202. In many implementations, these functional components comprise instructions or programs that are executable by the processors 1202 and that, when executed, implement operational logic for performing the actions attributed above to the content provider site 910 and content provider 904. Functional components of the content provider site 910 that may be executed on the processors 1202 for implementing the various functions and features related to providing content items and information 902 related to content items, such as information for interfaces 104, 400, 500, 600 and 700, include the content preparation module 922, the content item store module 926, the delivery module 930 and the supplemental information module 942. Additional functional components stored in the computer-readable media 1204 may include an operating system 1208 for controlling and managing various functions of the host computing device(s) 906.

In addition, the computer-readable media 1204 may include, or the host computing device(s) 906 may access, data that may include the content item library 940, including one or more content items 106 having content 918 and metadata 920, including terms 706. The data may further include the information 902 related to content items to be sent to electronic devices 100 for generating the interfaces 104, 400, 500, 600 and 700. The data may further include the user information 932, including information for one or more user accounts 934 and user data 936. In addition, the computer-readable media 1204 may store or the host computing devices(s) 906 may access the content item catalog 928 used by the content item store module 926. The host computing device(s) 906 may also include many other logical, programmatic and physical components, of which those described above are merely examples that are related to the discussion herein.

The communication interface(s) 1206 may include one or more interfaces and hardware components for enabling communication with various other devices, such as the electronic devices 100, over the network(s) 908. For example, communication interface(s) 1206 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 908 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 906 may further be equipped with various input/output devices 1210. Such I/O devices 1210 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 13:
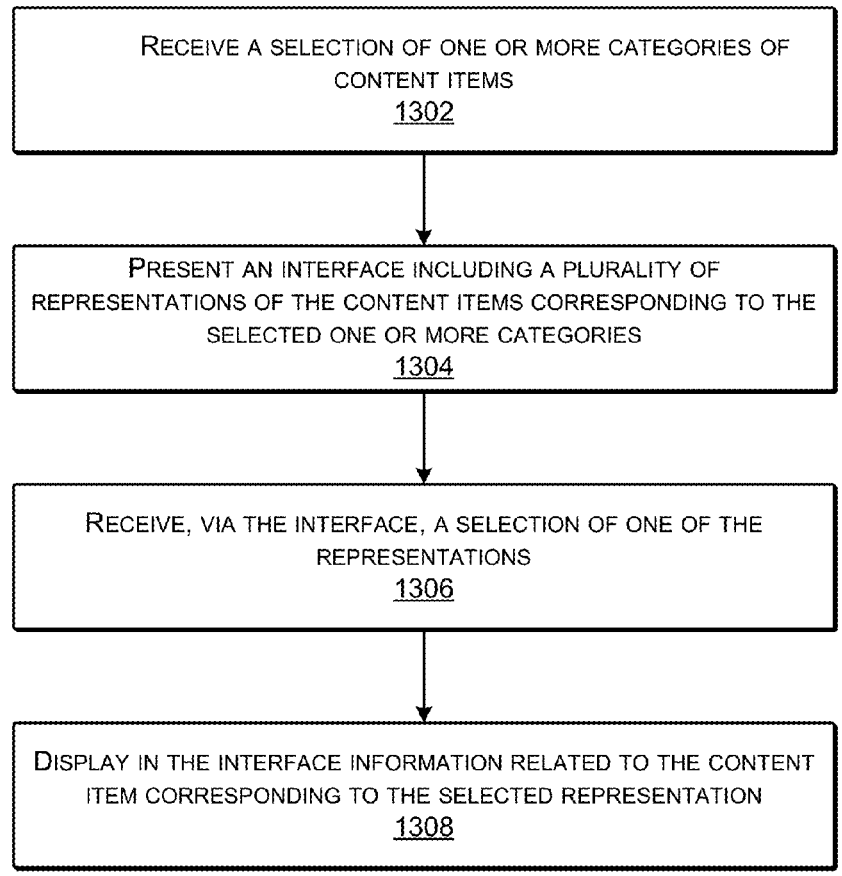
FIG. 13 is a flow diagram illustrating an example process that may be executed by an electronic device according to some implementations.
Figure 14:
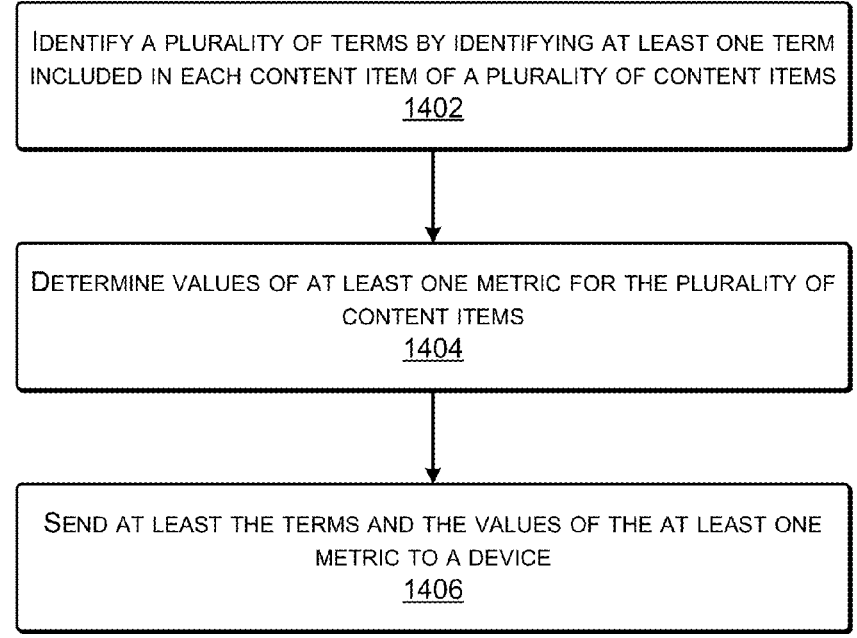
FIG. 14 is a flow diagram illustrating an example process that may be executed by a computing device of a content provider according to some implementations.

FIGS. 13-14 illustrate example processes for presenting information related to content items according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 13 is a flow diagram illustrating an example process 1300 that may be executed by an electronic device 100 for presenting information related to content items according to some implementations.

At 1302, the device receives a selection of one or more categories of content items. For example, a user may select one or more categories of content items in the user interface. Examples of categories may include genre categories, Library of Congress classification categories and/or Dewey decimal system categories.

At 1304, the device presents an interface including a plurality of representations of the content items corresponding to the selected one or more categories. For example, the interface may include the plurality of representations grouped according to the selected one or more categories. Furthermore, each representation displayed in the interface may be sized to indicate a value of at least one metric relative to the values of the metric for the other representations displayed in the interface. In addition, each representation may include a graphic effect that indicates a quality of the metric value, such as a rate of change of the value of the at least one metric over a period of time. In other examples, the graphic effect may indicate a value of a different metric for a content item relative to the other content items. The graphic effect may include at least one of a color, a pattern, or a graphic element.

At 1306, the device receives, via the interface, a selection of one of the representations. For example, a user may tap on, click on, or otherwise select one of the representations displayed in the interface.

At 1308, the device displays in the interface information related to the content item corresponding to the selected representation. For example, the device may display in the interface a pop-up window or label that identifies the content item, an author of the content item or the like. In some examples, pop up window or label may include, or the user may navigate to, additional information about the corresponding content item, such as a synopsis of the content item, pricing information for the content item and/or a link to purchase the content item.

FIG. 14 is a flow diagram illustrating an example process 1400 that may be executed by a computing device of a content provider in connection with presenting information related to content items according to some implementations.

At 1402, the computing device identifies a plurality of terms by identifying at least one term included in each content item of a plurality of content items. For example, the computing device may identify a plurality of terms in each content item, such as a character mentioned in the content item, a person mentioned in the content item, a place mentioned in the content item, a thing mentioned in the content item, an organization or group mentioned in the content item, a phrase used in the content item, or a topic mentioned in the content item.

At 1404, the computing device may determine values of at least one metric for the plurality of content items. Examples of metrics that the computing device may determine for content items may include a sales ranking of each content item, a number of each content item open on user devices within a period of time, a number of views of each content item on at least one website, a number of annotations made to each content item, a frequency with which each content item is mentioned on at least one online location, or a ranking of each content item based, at least in part, on user review ratings.

At 1406, the computing device sends at least the terms and the values of the at least one metric to a device. For example, the computing device may send, to user devices, information related to content items that includes the identified terms and the values of the at least one metric to enable the user devices to present the information in an interface, such as interfaces 104, 500, 600 and 700 and discussed above.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media maintaining instructions executable by one or more processors to perform operations comprising:
    receiving a selection of a category of content items, the category being one of a plurality of categories;
    generating an interface including a first representation of a first content item, the first representation being included in a category area of the interface according to the category and the first representation being one of a plurality of representations;
    receiving, via the interface, an indication of a geographic location; and
    determining a first value of a metric for the first content item based at least in part on the geographic location;
    determining a size of the first representation based, as least in part, on the first value of the metric for the first content item relative to values of the metric for others of the content items;
    determining a size of the category area based, at least in part, on a second value of the metric for the category relative to values of the metric for other categories;
    generating a graphic effect to indicate a quality of the first value of the metric;
    receiving, via the interface, a selection of a second representation of the plurality of representations; and
    presenting in the interface information related to a second content item corresponding to the second representation.

2. The one or more non-transitory computer-readable media as recited in claim 1, wherein the plurality of categories are categorized according to at least one of:
    genre categories;
    Dewey decimal system categories;
    Library of Congress classification system categories;
    Book Industry Standards and Communication subject codes;
    Colon classification categories; or
    Online Computer Library Center category codes.

3. The one or more non-transitory computer-readable media as recited in claim 1, wherein the first value of the metric includes at least one of:
    a sales ranking of the first content item;
    a number of the first content item open on user devices within a period of time;
    a number of views of the first content item on at least one website;
    a number of annotations made to the first content item;
    a frequency with which the first content item is mentioned on at least one online location; or
    a ranking of the first content item based, at least in part, on user review ratings.

4. The one or more non-transitory computer-readable media as recited in claim 1, wherein the quality of the metric indicates a rate of change of the first value of the metric over a period of time.

5. The one or more non-transitory computer-readable media as recited in claim 4, wherein the graphic effect includes at least one of:
    a coloration applied to the first representation, wherein different colors distinguish a positive rate of change from a negative rate of change; or
    patterning applied to the first representation, wherein different patterns distinguish a positive rate of change from a negative rate of change.

6. A method comprising:
    under control of one or more processors configured with executable instructions,
    generating an interface including a plurality of representations related to content items, wherein a first representation of the plurality of representations is grouped according to a content item characteristic;
    receiving, via the interface, a selection of a geographic location;
    determining a value of a metric for a content item based at least in part on the geographic location:
    determining a size of the first representation to indicate the value of the metric for the content item relative to values of the metric for other content items, wherein the first representation includes a graphic effect to indicate a quality of the value of the metric;
    receiving, via the interface, an additional selection of a category of content items;
    presenting, with the plurality of representations, at least a second representation corresponding to the category; and
    resizing the first representation presented in the interface relative to other representations of the plurality of representations to accommodate the second representation based at least in part on the value of the metric for the content item.

7. The method as recited in claim 6, wherein:
    the graphic effect comprises at least one of a color or pattern;
    a first color or pattern indicates the quality is a positive rate of change of the value of the metric over time; and
    a second, different color or pattern, indicates the quality is a negative rate of change of the value of the metric over time.

8. The method as recited in claim 7, wherein a brightness, lightness or intensity of the color distinguishes a greater rate of change from a lesser rate of change.

9. The method as recited in claim 6, wherein:
the metric is a number of sales of the content item over a period of time; and
the size of the first representation relative to the other representations is related, at least in part, to the number of sales of the content item relative to a number of sales of the other content items.

10. The method as recited in claim 9, wherein the first representation includes at least one of a coloration, pattern or graphic element to indicate a rate of change of the number of sales of the content item over time.

11. The method as recited in claim 9, wherein:
the metric for the number of sales is a first metric; and
the first representation includes at least one of a coloration, pattern or graphic element to indicate a value of a second metric of the content item, different from the first metric for the number of sales.

12. The method as recited in claim 11, wherein the second metric includes at least one of:
a number of the content item open on user devices within a period of time;
a number of views of the content item on at least one website;
a number of annotations made to the content item;
a frequency with which the content item is mentioned on at least one online location; or
a ranking of the content item based, at least in part, on user review ratings.

13. The method as recited in claim 6, wherein:
the metric is a number of annotations made to the content item over a period of time; and
the size of the first representation relative to the other representations is related, at least in part, to the number of annotations made to the content item relative to a number of annotations made to the other content items.

14. The method as recited in claim 6, wherein:
the metric is a number of instances of the content item open on user devices within a period of time; and
the size of the first representation relative to the other representations is related, at least in part, to the number of instances of the content item open on user devices relative to a number of instances of the other content items open on the user devices within the period of time.

15. The method as recited in claim 6, wherein:
the metric is a number of views of the content item on at least one website over a period of time; and
the size of the first representation relative to the other representations is related, at least in part, to the number of views of the content item relative to a number of views of the other content items.

16. The method as recited in claim 6, wherein:
the metric is a frequency with which the content item is mentioned on at least one of a social network site, a microblog site, a RSS feed, or a news feed; and
the size of the first representation relative to the other representations is related, at least in part, to the frequency with which the content item is mentioned relative to a frequency with which the other content items are mentioned.

17. The method as recited in claim 6, wherein:
the metric is a ranking of the content item based, at least in part, on user review ratings; and
the size of the first representation relative to the other representations is related, at least in part, to the ranking of the content item based on the user review ratings.

18. The method as recited in claim 6, wherein the first representation corresponds to an author of the content item.

19. The method as recited in claim 6, wherein the first representation corresponds to a publisher of the content item.

20. The method as recited in claim 6, wherein the first representation corresponds to a subcategory of the content item.

21. The method as recited in claim 6, wherein the first representation corresponds to a term obtained from the content item.

22. The method as recited in claim 6, wherein the metric includes at least one of:
a sales ranking of the content item;
a number of the content item open on user devices within a period of time;
a number of views of the content item on at least one website;
a number of annotations made to the content item;
a frequency with which the content item is mentioned on at least one online location; or
a ranking of the content item based, at least in part, on user review ratings.

23. The method as recited in claim 6, wherein the content item characteristic includes at least one of:
a genre category of the content item;
a Library of Congress classification of the content item;
a Dewey decimal classification of the content item;
a Book Industry Standards and Communication subject code;
a Colon classification category; or
an Online Computer Library Center category code.

24. The method as recited in claim 6, further comprising:
receiving, via the interface, a deselection of the category;
removing from the plurality of representations a third representation corresponding to the category at least partly based on the deselection of the category; and
at least one of rearranging or resizing the first representation presented in the interface to fill an area from which the third representation was removed.

25. The method as recited in claim 6, wherein the first representation includes a rectangle.

26. The method as recited in claim 6, wherein the first representation includes a word.

27. The method as recited in claim 6, further comprising animating changes in the first representation based on changes in the value of the metric over multiple periods of time.

28. The method as recited in claim 6, further comprising receiving, via the interface, an indication of at least one of:
a price;
a reading level; or
a level of adult content; and
presenting the first representation in the interface based at least in part on the indication.

29. A device comprising:
one or more processors;
one or more computer-readable media; and
one or more modules maintained on the one or more computer-readable media and executed by the one or more processors to perform acts comprising:
determining terms of textual content items that are significant based, at least in part, on a criterion, wherein the textual content items are grouped according to one or more categories;

generating an interface including a representation of a term that has been determined to be significant, wherein the representation has a size to indicate a value of a metric of the term relative to values of the metric for others of the terms;

receiving, via the interface, a selection of a category of the one or more categories;

receiving, via the interface, an indication of a geographic location; and resizing the representation relative to other representations based at least in part on determining the value of the metric for the geographic location.

30. The device as recited in claim 29, wherein the interface includes a plurality of representations and the acts further comprise arranging a subset of the plurality of representations into a plurality of subcategories of the category.

31. The device as recited in claim 29, the acts further comprising presenting at least one additional representation corresponding to the category.

32. The device as recited in claim 29, the acts further comprising:

receiving, via the interface, an additional selection of the representation; and presenting in the interface information related to a content item corresponding to the representation.

33. The device as recited in claim 29, wherein:

the metric is a first metric; and the representation includes a graphic effect to indicate a least one of:

a rate of change of the value of the first metric over time; or a value of a second metric.

34. A method comprising:

under control of one or more processors configured with executable instructions, generating an interface including a plurality of representations of content items, wherein a representation of the plurality of representations is included in a category area of the interface according to a category of a content item of the content items;

receiving, via the interface, an indication of a geographic location;

determining a value of a metric for the content item based at least in part on the geographic location;

determining a size of the representation to indicate the value of the metric related to the content item relative to values of the metric for others of the content items;

generating a graphic effect for the representation to indicate a quality of the value of the metric; and determining a size of the category area to indicate an additional value of the metric for the category relative to values of the metric for other categories.

35. The method as recited in claim 34, further comprising:

receiving, via the interface, a selection of the category; and presenting at least one additional representation corresponding to the category.

36. The method as recited in claim 34, further comprising:

receiving, via the interface, a selection of the category; and arranging a subset of the plurality of representations into a plurality of subcategories of the category, wherein the subset of the plurality of representations corresponds to the category.

\* \* \* \* \*